US012738076B2

(12) United States Patent
Kim et al.

(10) Patent No.: US 12,738,076 B2
(45) Date of Patent: Sep. 15, 2026

(54) APPARATUS AND METHOD FOR DETECTING DISTRACTION OF DRIVER IN DRIVING MONITORING SYSTEM

(71) Applicant: NOTA, INC., Daejeon (KR)

(72) Inventors: Sangtae Kim, Hwaseong-si (KR); Eunsik Jung, Seoul (KR); Wheemyung Shin, Seoul (KR)

(73) Assignee: NOTA, INC., Daejeon (KR)

( * ) Notice: Subject to any disclaimer, the term of this patent is extended or adjusted under 35 U.S.C. 154(b) by 211 days.

(21) Appl. No.: 18/818,261

(22) Filed: Aug. 28, 2024

(65) Prior Publication Data

US 2025/0200997 A1 Jun. 19, 2025

(30) Foreign Application Priority Data

Dec. 15, 2023 (KR) ........................ 10-2023-0182553

(51) Int. Cl.
*G06V 20/59* (2022.01)
*B60Q 9/00* (2006.01)
(Continued)

(52) U.S. Cl.
CPC .......... *G06V 20/597* (2022.01); *G06V 10/762* (2022.01); *G06V 40/16* (2022.01);
(Continued)

(58) Field of Classification Search
None
See application file for complete search history.

(56) References Cited

U.S. PATENT DOCUMENTS 10,848,738 B1 * 11/2020 Petrangeli .............. H04N 23/64
2011/0241863 A1 * 10/2011 Ono .................. B60W 50/0097 340/439

(Continued)

FOREIGN PATENT DOCUMENTS

JP 2016099718 A 5/2016
KR 19980023416 U 7/1998

(Continued)

OTHER PUBLICATIONS

R. Cambuzat, F. Elisei, G. Bailly, O. Simonin and A. Spalanzani, "Immersive Teleoperation of the Eye Gaze of Social Robots—Assessing Gaze-Contingent Control of Vergence, Yaw and Pitch of Robotic Eyes," ISR 2018; 50th International Symposium on Robotics, Munich, Germany, 2018, pp. 1-8. (Year: 2018).*

(Continued)

*Primary Examiner* — Sath V Perungavoor
(74) *Attorney, Agent, or Firm* — Seed Intellectual Property Law Group LLP

(57) ABSTRACT

A method for detecting distraction of a driver in a driver monitoring system is disclosed. The method includes receiving a first image including the driver within a vehicle. The method includes determining a gaze class corresponding to the first image among a plurality of gaze classes by using a first model in response to the receiving the first image. The plurality of gaze classes includes a first gaze class indicating that the driver is gazing in a front direction and a second gaze class indicating that the driver is gazing in a non-front direction. The method includes determining whether the distraction of the driver is present in the first image based on the gaze class corresponding to the first image.

20 Claims, 11 Drawing Sheets

(51) Int. Cl.

| | |
|---|---|
| ***G06V 10/762*** | (2022.01) |
| ***G06V 10/82*** | (2022.01) |
| ***G06V 40/16*** | (2022.01) |
| ***G06V 40/18*** | (2022.01) |

(52) U.S. Cl.

CPC ................ *G06V 40/18* (2022.01); *B60Q 9/00* (2013.01); *G06V 10/82* (2022.01)

(56) References Cited

U.S. PATENT DOCUMENTS

| | | | | |
|---|---|---|---|---|
| 2015/0116493 | A1* | 4/2015 | Bala | G06V 20/597 348/148 |
| 2019/0213429 | A1* | 7/2019 | Sicconi | G06V 40/18 |
| 2019/0318181 | A1 | 10/2019 | Katz et al. | |
| 2020/0151502 | A1* | 5/2020 | Huang | G06F 18/23 |
| 2021/0309221 | A1* | 10/2021 | Alpert | G06V 20/597 |
| 2021/0312193 | A1* | 10/2021 | Alpert | B60W 40/08 |
| 2022/0180109 | A1* | 6/2022 | Alpert | G06V 20/56 |
| 2023/0060798 | A1 | 3/2023 | Wang et al. | |
| 2023/0196794 | A1 | 6/2023 | Chung et al. | |
| 2024/0029453 | A1* | 1/2024 | Sano | G06V 20/597 |
| 2024/0071108 | A1* | 2/2024 | Edwards | G06V 40/20 |
| 2024/0351588 | A1* | 10/2024 | Hecht | G06V 10/82 |
| 2025/0200997 | A1* | 6/2025 | Kim | G06V 40/18 |

FOREIGN PATENT DOCUMENTS

| | | |
|---|---|---|
| KR | 102438689 B1 | 9/2022 |
| KR | 10-2023-0071593 A | 5/2023 |

OTHER PUBLICATIONS

X. Liu, H. Lu and W. Li, “Multi-manifold modeling for head pose estimation,” 2010 IEEE International Conference on Image Processing, Hong Kong, China, 2010, pp. 3277-3280, doi: 10.1109/ICIP.2010.5652540. (Year: 2010).*

* cited by examiner

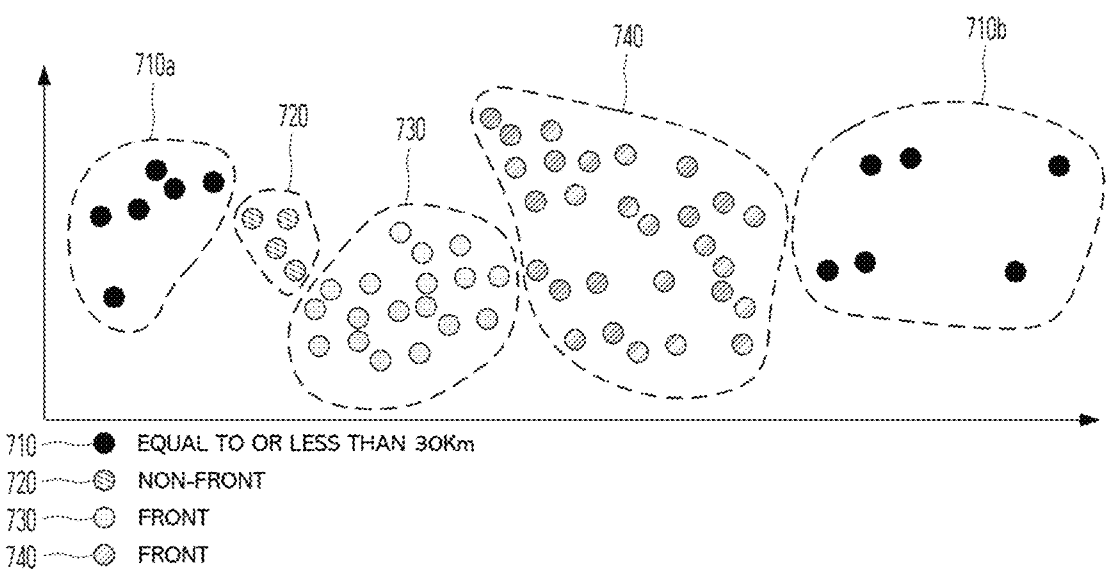
FIG. 7
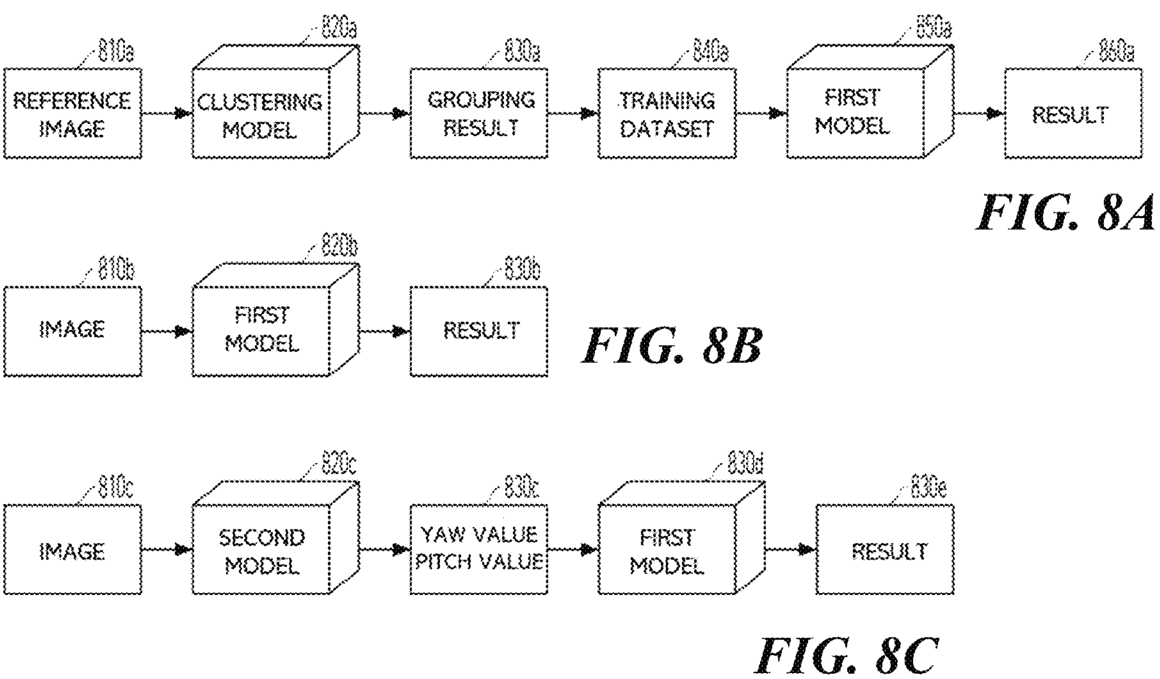
FIG. 8A
FIG. 8B
FIG. 8C

APPARATUS AND METHOD FOR DETECTING DISTRACTION OF DRIVER IN DRIVING MONITORING SYSTEM

CROSS-REFERENCE TO RELATED APPLICATIONS

This application claims priority to and the benefit of Korean Patent Application No. 10-2023-0182553 filed in the Korean Intellectual Property Office on Dec. 15, 2023, the entire contents of which are incorporated herein by reference.

BACKGROUND

Technical Field

The present disclosure relates to a driver monitoring system, and more particularly, a method and an apparatus for detecting distraction according to a driver monitoring result.

Description of the Related Art

A driver monitoring system (DMS) is technology that detects a condition of a driver and supports safe driving. The DMS can perform a function of detecting drowsiness, distraction, whether to wear a seatbelt is worn and/or drunk driving of the driver, and warning the driver, or controlling a vehicle. The DMS is evaluated as one of the core technologies of an autonomous vehicle in order to ensure a safe operation of the vehicle, and can also contribute to protecting the safety of the driver and preventing traffic accidents.

The DMS can use various sensors such as cameras, infrared sensors, acceleration sensors, and gyroscopes to detect the condition of the driver. The camera can be used to determine the drowsiness or distraction of the driver by detecting a facial expression or eyelid movement of the driver. The infrared sensor can be used for tracking the gaze of the driver by detecting pupil movement of the driver. The acceleration sensor and the gyroscope can be used for determining the drowsiness or drunken driving by detecting a posture and movement of the driver.

As a method for enhancing the accuracy and reliability of the DMS, technology of sensors are being advanced. When a resolution and an image quality of the camera are enhanced, the facial expression and the eyelid movement of the driver can be more accurately detected. When the performance of the infrared sensor is enhanced, the pupil movement of the driver can be more accurately tracked. When the performances of the acceleration sensor and the gyroscope are enhanced, the posture and the movement of the driver can be more precisely measured.

As a factor to enhance the performance of the DMS, the development of artificial intelligence technology can be chosen. As the artificial intelligence technology is applied to the DMS, the condition of the driver can be more elaborately detected with the advancement of the sensor.

BRIEF SUMMARY

However, even if the condition of the driver is elaborately detected as the detection technology is developed, when a separated alarm related algorithm is not added to a model used in the DMS, the alarm can be generated in each small behavior of the driver, so an alarm during driving may also still interfere with driving. In addition, a sensitive driver detection algorithm can also still increase a frequency of a false alarm. When the frequency of the false alarm increases, there can be a problem in performance and reliability of a DMS product. Further, since installation locations of DMS products for aftermarket cannot be specified, there may be a problem in that it should be customized for each vehicle where a location of a front is based on the driver. Moreover, a size and an angle of a face on the camera vary depending on a driving habit and a driving behavior of the driver, so there can be a problem in that accuracy for a detection result of the DMS can be lowered. In addition, there can also be a situation in which an object (e.g., a seatbelt) to be detected is not normally detected in an image depending on various occlusion situations and illumination situations which occur during driving.

The inventors of the present disclosure have provided various embodiments that address various technical problems in the related art, including the above problems identified by the inventors.

Various embodiments of the present disclosure have been made in an effort to optimize an alarm provided by the DMS.

An exemplary embodiment of the present disclosure has been made in an effort to accurately detect the driver's condition or status by considering various situations that arise during the driving process.

The technical objects addressed by the present disclosure are not limited to those mentioned above, and other technical objects not explicitly mentioned will be clearly understood by those skilled in the art from the following description.

An exemplary embodiment of the present disclosure provides a method for detecting distraction of a driver in DMS (Driver Monitoring Systems). The method comprises: receiving a first image including the driver within a vehicle, determining a gaze class corresponding to the first image among a plurality of gaze classes by using a first model in response to the receiving the first image, wherein the plurality of gaze classes include a first gaze class indicating that the driver is gazing in a front direction and a second gaze class indicating that the driver is gazing in a non-front direction, and determining whether the distraction of the driver is present in the first image based on the gaze class corresponding to the first image. The determining whether the distraction of the driver is present in the first image comprises: extracting a yaw value and a pitch value from the first image, and determining the distraction of the driver is present in the first image, by using a distance between the extracted yaw value and pitch value and a gaze cluster corresponding to the first image among a plurality of gaze clusters generated by clustering selected reference images.

In an exemplary embodiment, the determining whether the distraction of the driver is present in the first image comprises: setting a distraction score indicating a likelihood of the distraction of the driver higher, as a distance between the extracted yaw value and pitch value from the first image and at least one cluster belonging to the first gaze class is greater, or a distance between the extracted yaw value and pitch value from the first image and at least one cluster belonging to the second gaze class is smaller.

In an exemplary embodiment, the yaw value and pitch value corresponding to the driver's face in the first image are generated by a second model different from the first model, and the second model is an artificial intelligence model pre-trained to output a yaw value and a pitch value corresponding to the driver's face in the first image from the first image.

In an exemplary embodiment, the first model corresponds to an artificial intelligence model pre-trained to output, in response to a yaw value and a pitch value extracted from an image, a gaze class corresponding to the yaw value and the pitch value extracted from the image and a distance between the yaw value and the pitch value and the gaze class. The pre-trained first model is updated by additionally receiving a reference image extracted according to a pre-determined condition, and the oldest reference image based on a receiving time of reference images is deleted from a queue, when the received reference image exceeds a threshold size of the queue of the first model.

In an exemplary embodiment, the first model corresponds to an artificial intelligence model pre-trained by using a training dataset generated by clustering a dataset consisting of reference images that satisfy a condition that a driving speed of the vehicle exceeds or equal to a selected threshold speed among multiple images.

In an exemplary embodiment, the training dataset is generated by labeling each of the plurality of gaze clusters as the first gaze class indicating the driver is gazing in the front direction or the second gaze class indicating the driver is gazing in the non-front direction, based on quantitative information of images included in each of the plurality of gaze clusters generated by clustering the reference images.

In an exemplary embodiment, the determining whether the distraction of the driver is present in the first image comprises: determining a first distraction score corresponding to the first image, based on the gaze cluster corresponding to the first image among the plurality of gaze clusters generated by clustering the selected reference images and the yaw value and the pitch value extracted from the first image; generating a first distraction primary estimation result indicating whether the distraction is present in the first image by comparing the first distraction score with a first threshold value; and determining a distraction alarm corresponding to the first image by performing a first voting using the first distraction primary estimation result. The first voting generates a group distraction estimation result representing an image group consisting of the first image and a selected first number of sequential images received prior to the first image, by using a first distraction primary estimation result of each of the first image and the selected first number of the sequential images received prior to the first image, and generates a first distraction secondary estimation result to be used as a parameter for determining a distraction alarm corresponding to the first image. The group distraction estimation result includes a result value representing the group among a result value indicating a presence of the distraction and a result value indicating an absence of the distraction.

In an exemplary embodiment, the determining whether the distraction of the driver is present in the first image comprises: determining a first distraction score corresponding to the first image, based on a gaze cluster corresponding to the first image among the plurality of gaze clusters generated by clustering the selected reference images and the yaw value and the pitch value extracted from the first image; generating a first distraction primary estimation result indicating whether the distraction is present in the first image by comparing the first distraction score with a first threshold value; generating a first distraction secondary estimation result by performing a first voting using the first distraction primary estimation result; and determining a distraction alarm corresponding to the first image by performing a second voting using the first distraction secondary estimation result. The first voting generates a distraction secondary estimation result to be used in the second voting by using a distraction primary estimation result of each of a plurality of images including the first image, and the second voting is used to determine the distraction alarm by using the distraction secondary estimation result of each of the plurality of images including the first image.

In an exemplary embodiment, the second voting determines whether there is continuity in distraction secondary estimation results within an image group consisting of the first image and a selected second number of sequential images received prior to the first image, and the determining the distraction alarm corresponding to the first image comprises determining to generate the distraction alarm when there is continuity in the distraction secondary estimation results.

In an exemplary embodiment, the generating the first distraction secondary estimation result comprises, generating one or more current counter values corresponding to the first image by increasing or decreasing one or more previous counter values corresponding to a second image received prior to the first image based on a result of the first voting, and generating the first distraction secondary estimation result including the one or more current counter values. The determining a distraction alarm corresponding to the first image comprises, determining ON or OFF state of one or more distraction alarms corresponding to the first image by comparing the one or more current counter values with one or more selected counter threshold values.

In an exemplary embodiment, the determining the first distraction secondary estimation result comprises: determining at least one current counter value corresponding to the first image by increasing or decreasing at least one previous counter value corresponding to a second image received prior to the first image based on a result of the first voting, and wherein a unit of an increase or a decrease in the at least one previous counter value is determined based on a time difference between a receiving time of the second image and a receiving time of the first image.

In an exemplary embodiment, the first threshold value is determined based on at least one previous distraction primary estimation result corresponding to at least one previous image received prior to the first image.

In an exemplary embodiment, the determining the gaze class corresponding to the first image comprises: extracting the yaw value and the pitch value from the first image; determining the gaze cluster corresponding to the first image among the plurality of gaze clusters generated by clustering reference images extracted based on a selected condition, based on a distance between the extracted yaw value and pitch value and a result of the clustering of the reference images; and determining the gaze class corresponding to the first image as a gaze class to which the gaze cluster corresponding to the first image belongs among the plurality of gaze classes.

In an exemplary embodiment, a computer program stored in a non-transitory computer readable storage medium is disclosed. The computer program allows at least one processor to perform following operations to detect distraction of a driver in DMS (Driver Monitoring Systems) when executed by the at least one processor. The operations comprise: receiving a first image including the driver within a vehicle; determining a gaze class corresponding to the first image among a plurality of gaze classes by using a first model in response to the receiving the first image, wherein the plurality of gaze classes include a first gaze class indicating that the driver is gazing in a front direction and a second gaze class indicating that the driver is gazing in a non-front direction; and determining whether the distraction of the driver is present in the first image based on the gaze class corresponding to the first image. The determining whether the distraction of the driver is present in the first image comprises: extracting a yaw value and a pitch value from the first image; and determining the distraction of the driver is present in the first image, by using a distance between the extracted yaw value and pitch value and a gaze cluster corresponding to the first image among a plurality of gaze clusters generated by clustering selected reference images.

In an exemplary embodiment, a computing device comprising at least one processor and a memory is disclosed. The at least one processor: receives a first image including the driver within a vehicle, determines a gaze class corresponding to the first image among a plurality of gaze classes by using a first model in response to the receiving the first image, wherein the plurality of gaze classes include a first gaze class indicating that the driver is gazing in a front direction and a second gaze class indicating that the driver is gazing in a non-front direction, and determines whether the distraction of the driver is present in the first image based on the gaze class corresponding to the first image. The determining of whether the distraction of the driver is present in the first image comprises: extracting a yaw value and a pitch value from the first image; and determining the distraction of the driver is present in the first image, by using a distance between the extracted yaw value and pitch value and a gaze cluster corresponding to the first image among a plurality of gaze clusters generated by clustering selected reference images.

A technique according to an exemplary embodiment of the present disclosure can optimize an alarm provided in the DMS.

A technique according to an exemplary embodiment of the present disclosure can accurately detect the driver's condition or status by considering various situations that arise during the driving process.

BRIEF DESCRIPTION OF THE SEVERAL VIEWS OF THE DRAWINGS

FIG. 7 exemplarily illustrates a method for collecting training data for training a model according to an exemplary embodiment of the present disclosure.

FIGS. 8A, 8B, and 8C exemplarily illustrate a training and inference method of the model according to an exemplary embodiment of the present disclosure.

DETAILED DESCRIPTION

Figure 1:
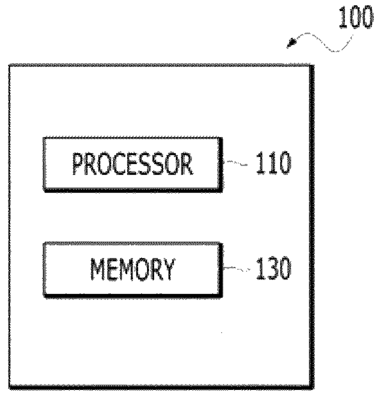
FIG. 1 schematically illustrates a block diagram of a computing device according to an exemplary embodiment of the present disclosure.

Various exemplary embodiments will now be described with reference to drawings. In this specification, various descriptions are presented to provide appreciation of the present disclosure. Prior to describing detailed contents for carrying out the present disclosure, it should be noted that configurations not directly associated with the technical gist of the present disclosure are omitted without departing from the technical gist of the present disclosure. Further, terms or words used in this specification and claims should be interpreted as meanings and concepts which match the technical spirit of the present disclosure based on a principle in which the inventor can define appropriate concepts of the terms in order to describe his/her disclosure by a best method.

"Module," "system," and/or "model" which are terms used in the specification refer to a computer-related entity, hardware, firmware, software, and a combination of the software and the hardware, or execution of the software, and can be used interchangeably. For example, the module may be a processing process executed on a processor, the processor, an object, an execution thread, a program, an application, and/or a computing device, but is not limited thereto. One or more modules may reside within the processor and/or a thread of execution. The module may be localized in one computer. One module may be distributed between two or more computers. Further, the modules may be executed by various computer-readable media having various data structures, which are stored therein. The modules may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" and "at least one" used in this specification designates and includes all available combinations of one or more items among enumerated related items. For example, the term "at least one of A or B" or "at least one of A and B" should be interpreted to mean "a case including only A," "a case including only B," and "a case in which A and B are combined."

It should be appreciated that the term "comprise/include" and/or "comprising/including" means presence of corresponding features and/or components. However, it should be appreciated that the term "comprises/includes" and/or "comprising/including" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

Those skilled in the art need to recognize that various exemplary components described in connection with the exemplary embodiments disclosed herein may be additionally implemented as hardware, computer software, or combinations of both sides.

The description of the presented embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure terms represented by N-th such as first, second, or third are used for distinguishing at least one entity. For example, entities expressed as first and second may be the same as each other or different from each other. Terms expressed in primary, secondary, or tertiary in the present disclosure are used to distinguish at least one entity. For example, N-th terms such as primary, second and tertiary may be used to distinguish a time order. In these examples, the larger the value of N, an entity which is temporally subsequent may be represented, and the smaller the value of N, an entity which is temporarily preceding may be represented.

The term "model" used in the present disclosure may be used as a meaning that encompasses the artificial intelligence based model, the artificial intelligence model, the computation model, the neural network, a network function, and the neural network. In an exemplary embodiment, the model may mean a model file, identification information of the model, an execution configuration of the model, a runtime of the model, and/or a framework of the model.

Driver monitoring systems (DMS) in the present disclosure may represent a software entity or a hardware entity to which a vehicle technology monitoring a state of a driver is applied, or a combination thereof. The DMS may be executed by a computing device according to an exemplary embodiment of the present disclosure.

The term image used in the present disclosure may be used as a meaning that encompasses one or more frames. For example, one image may correspond to one frame. In an exemplary embodiment, the image as a still image may correspond to a frame obtained from a moving picture.

In an exemplary embodiment, the image as capture data including the driver as an object may be obtained through a camera installed in a vehicle. In an exemplary embodiment, in the DMS, as the image is analyzed and/or processed, an anomaly corresponding to the driver may be detected, and/or whether an alarm corresponding to the anomaly is generated, the type of alarm, and/or the intensity of the alarm may be determined.

An expressing of determining the alarm in the present disclosure may be used to encompass determining whether the alarm is generated, determining the type of alarm, and/or the intensity of the alarm.

Hereinafter, for convenience of description, a technique in the present disclosure will be described by using the term "image." It will be apparent to those skilled in the art that the technique of the present disclosure can be implemented through the term "frame."

The term "anomaly" used in the present disclosure may be used to express an operation, a situation, or an element that inhibits the safety of the driver in the image or frame. As an example, the anomaly may include distraction, drowsiness, no seat belt (e.g., not wearing seat belt), and/or the presence of fireworks (or fire) of the driver.

The term "voting" used in the present disclosure may mean an algorithm for correcting an anomaly prediction result in order to increase the accuracy of anomaly detection and/or the accuracy of anomaly alarm generation. In an exemplary embodiment, the voting may mean a rule-based algorithm that combines results in a plurality of images in order to determine, correct, and/or adjust an anomaly result corresponding to a current image. In an exemplary embodiment, the voting may mean a method for determining a prediction result the current image based on prediction results in previous images. In the present disclosure, the anomaly prediction result and the prediction result may be used interchangeably with each other.

In an exemplary embodiment, a plurality of factors used in the voting may correspond to a plurality of images which are temporally obtained, respectively. In an exemplary embodiment, the plurality of factors used in the voting may correspond to prediction results (e.g., prediction results obtained from the model and/or prediction results to which previous voting results are reflected) of the plurality of images which are temporally obtained, respectively. For example, a first prediction result for a first image, a second prediction result for a second image, and a third prediction result for a third image may be considered as the factors used in the voting.

The technique according to an exemplary embodiment of the present disclosure may sequentially use a plurality of votings. For example, a result of a first voting may be used in a second voting, and a result of the second voting may be used in a third voting. As a plurality of votings that use prediction results corresponding to the previous images and the current image as the factors are sequentially used, the anomaly alarm may be provided more accurately.

According to an exemplary embodiment of the present disclosure, terms 'estimation' and 'prediction' can be interchangeably used.

FIG. 1 schematically illustrates a block diagram of a computing device 100 according to an exemplary embodiment of the present disclosure.

According to the exemplary embodiment of the present disclosure, the computing device 100 may include a processor 110 and a memory 130.

A configuration of the computing device 100 illustrated in FIG. 1 is only an example illustrated through simplification. In an exemplary embodiment of the present disclosure, the computing device 100 may include other components for performing a computing configuration of the computing device 100 and only some of the disclosed components may constitute the computing device 100. As an example, when the computing device 100 includes a user terminal, an output unit (not illustrated) and an input unit (not illustrated) may be included in a scope of the computing device 100.

The computing device 100 in the present disclosure may be used as a meaning that encompasses any type of server and any type of terminal. The computing device 100 may be used interchangeably with a computing device.

In the present disclosure, the computing device 100 may mean any type of component constituting a system for implementing exemplary embodiments of the present disclosure.

In an exemplary embodiment, the computing device 100 may mean a device in which a DMS is driven.

In an exemplary embodiment, the computing device 100 may mean a device for detecting an anomaly from an image of a driver, and/or determining whether to generate an alarm corresponding to the anomaly.

In an exemplary embodiment, the computing device 100 may mean a device used for training a model for detecting the anomaly from the image of the driver.

In an exemplary embodiment, the computing device 100 may mean a device used for training a model for detecting the anomaly from the image of the driver. In an exemplary embodiment, the computing device 100 may mean a device used for inferring a model for detecting the anomaly from the image of the driver.

In an exemplary embodiment, the computing device 100 may mean a server which exists remotely from a device in a vehicle, which obtains the image of the driver.

In an exemplary embodiment, the computing device 100 obtains the image of the driver from the device in the vehicle to detect the anomaly for the image and/or determine the alarm corresponding to the anomaly in the image. For example, whether the alarm corresponding to the anomaly is generated or the intensity of the alarm may be determined.

In an exemplary embodiment, the computing device 100 may obtain an object detection result from a target image including the driver. For example, the computing device 100 may obtain a detection result related to a seatbelt, a detection result related to eye closing, a detection result related to drowsiness, and/or a detection result related to front carelessness in the target image.

In an exemplary embodiment, the processor 110 may perform an overall operation of the computing device 100. The processor 110 may be constituted by at least one core. The processor 110 may include devices for data analysis and/or processing, which include a central processing unit (CPU), a general purpose graphics processing unit (GPGPU), a tensor processing unit (TPU), and the like of the computing device 100.

The processor 110 may read a computer program stored in the memory 130 to detect the anomaly and/or determine the anomaly alarm according to an exemplary embodiment of the present disclosure.

According to an exemplary embodiment of the present disclosure, the processor 110 may also perform a computation for learning a neural network. The processor 110 may perform calculations for learning the neural network, which include processing of input data for learning in deep learning (DL), extracting a feature in the input data, calculating an error, updating a weight of the neural network using back-propagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of the plurality of computing devices may be used together to process the learning of the network function and the data classification using the network function. Further, the computer program executed in the computing device 100 according to an exemplary embodiment of the present disclosure may be a CPU, GPGPU, or TPU executable program.

Additionally, the processor 110 may generally process an overall operation of the computing device 100. For example, the processor 110 processes data, information, signals, and the like input or output through the components included in the computing device 100 or drives the application program stored in a storage unit to provide information or a function appropriate for the user.

According to an exemplary embodiment of the present disclosure, the memory 130 may store any type of information generated or determined by the processor 110 or any type of information received by the computing device 100. According to an exemplary embodiment of the present disclosure, the memory 130 may be a storage medium that stores computer software which allows the processor 110 to perform the operations according to the exemplary embodiments of the present disclosure. Therefore, the memory 130 may mean computer-readable media for storing software codes required for performing the exemplary embodiments of the present disclosure, data which become execution targets of the codes, and execution results of the codes.

According to an exemplary embodiment of the present disclosure, the memory 130 may mean any type of storage medium, and include, for example, at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the memory 130 used in the present disclosure is not limited to the examples.

In the present disclosure, the communication unit (not illustrated) may be configured regardless of communication modes such as wired and wireless modes and constituted by various communication networks including a personal area network (PAN), a wide area network (WAN), and the like. Further, the network unit 150 may operate based on known World Wide Web (WWW) and may adopt a wireless transmission technology used for short-distance communication, such as infrared data association (IrDA) or Bluetooth.

The computing device 100 in the present disclosure may include any type of user terminal and/or any type of server. Therefore, the exemplary embodiments of the present disclosure may be performed by the server and/or the user terminal.

In an exemplary embodiment, the user terminal may include any type of terminal which is capable of interacting with the server or another computing device. The user terminal may include, for example, a mobile phone, a smart phone, a laptop computer, personal digital assistants (PDA), a slate PC, a tablet PC, and an Ultrabook. In an exemplary embodiment, the user terminal may mean a device including a camera, which is installed in the vehicle.

In an exemplary embodiment, the server may include, for example, any type of computing system or computing device such as a microprocessor, a mainframe computer, a digital processor, a portable device, and a device controller.

In an exemplary embodiment, the server may include a storage unit (not illustrated) for storing data and/or information used in the present disclosure. The storage unit may be included in the server, or may be present under the management of the server. As another example, the storage unit may also be present outside the server, and implemented in a form which is capable of communicating with the server. In this case, the storage unit may be managed and controlled by another external server different from the server. As another example, the storage unit may also be present outside the server, and implemented in a form which is capable of communicating with the server. In this case, the storage unit may be managed and controlled by another external server different from the server.

Figure 2:
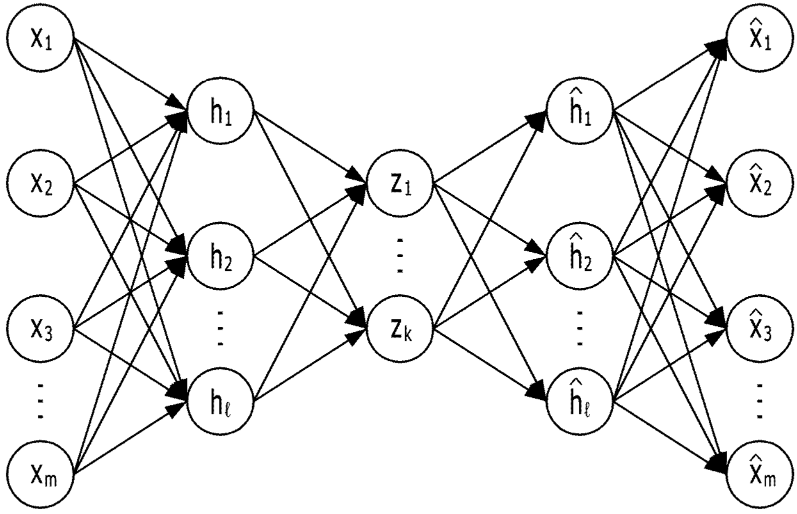
FIG. 2 illustrates an exemplary structure of an artificial intelligence-based model according to an exemplary embodiment of the present disclosure.

FIG. 2 illustrates an illustrative structure of an artificial intelligence model according to an exemplary embodiment of the present disclosure.

Throughout the present disclosure, the model, the artificial intelligence model, the artificial intelligence based model, the operation model, and the neural network, the network function, and the neural network may be used interchangeably.

The artificial intelligence model in the present disclosure may include models which are utilizable in various domains, such as a model for image processing such as object segmentation, object detection, and/or object classification, a model for text processing such as data prediction, text semantic inference and/or data classification, etc.

The neural network may be generally constituted by an aggregate of calculation units which are mutually connected to each other, which may be called "node." The nodes may also be called neurons. The neural network is configured to include one or more nodes. The nodes (or neurons) constituting the neural networks may be mutually connected to each other by one or more links.

The node in the artificial intelligence model may be used to mean a component that constitutes the neural network, and for example, the node in the neural network may correspond to the neuron.

In the neural network, one or more nodes connected through the link may relatively form a relationship between an input node and an output node. Concepts of the input node and the output node are relative and a predetermined node which has the relationship of the output node with respect to one node may have the relationship of the input node in the relationship with another node and vice versa. As described above, the relationship of the output node to the input node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable, and the weight may be varied by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links. For example, when the same number of nodes and links exist and two neural networks in which the weight values of the links are different from each other exist, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed from the initial input node up to the corresponding node. However, definition of the layer is predetermined for description and the order of the layer in the neural network may be defined by a method different from the aforementioned method. For example, the layers of the nodes may be defined by the distance from a final output node.

In an exemplary embodiment of the present disclosure, the set of the neurons or the nodes may be defined as the expression "layer."

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

The deep neural network (DNN) may mean a neural network including a plurality of hidden layers other than the input layer and the output layer. When the deep neural network is used, the latent structures of data may be identified. That is, photographs, text, video, voice, protein sequence structure, genetic sequence structure, peptide sequence structure, and/or potential structure of music (e.g., what objects are in the photo, what is the content and emotions of the text, what contents and emotions of the voice, etc.). The deep neural network may include convolutional neural network (CNN), recurrent neural network (RNN), auto encoder, generative adversarial networks (GAN), restricted Boltzmann machine (RBM), deep belief network (DBN), Q network, U network, Siamese network, etc. The description of the deep neural network described above is just an example and the present disclosure is not limited thereto.

The artificial intelligence model of the present disclosure may be expressed by a network structure of an arbitrary structure described above, including the input layer, the hidden layer, and the output layer.

The neural network which may be used in a clustering model in the present disclosure may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

According to an exemplary embodiment of the present disclosure, a computer readable medium or a computer program included in the computer readable medium is disclosed, which stores a data structure including the artificial intelligence model. The data structure may be stored in a storage unit (not illustrated) in the present disclosure, and executed by the processor 110 and transmitted and received by a communication unit (not illustrated).

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device may perform operations while using the resources of the computing device to a minimum. Specifically, the computing device may increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data listing structure that may access data limitedly and unlike a stack, the queue may be a data structure (FIFO-First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called "node." The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight may be varied by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, R-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example, and the present disclosure is not limited thereto.

Figure 3:
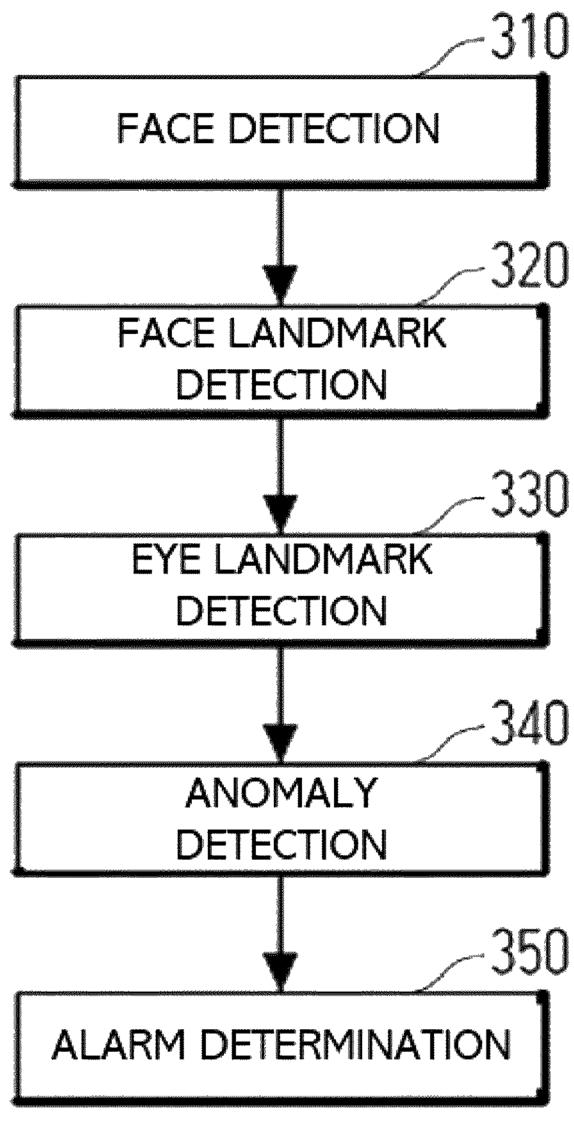
FIG. 3 exemplarily illustrates a method for detecting anomaly in a DMS and determining an anomaly alarm according to an exemplary embodiment of the present disclosure.

FIG. 3 exemplarily illustrates a method for detecting an anomaly in a DMS and determining an anomaly alarm according to an exemplary embodiment of the present disclosure. As illustrated in FIG. 3, the computing device 100 may detect a face of a driver (310).

In an exemplary embodiment, the computing device 100 may obtain an image from a camera installed in a vehicle. For example, the image may include the driver in the vehicle.

In an exemplary embodiment, the computing device 100 may detect the face of the driver from the obtained image by using a model for face detection. For example, the model may include an object detection model and/or an object segmentation model. For example, the model may correspond to an artificial intelligence based model pre-trained to detect and/or segment a face of a person in the image.

In an exemplary embodiment, the model for the face detection may correspond to a detection model.

In an exemplary embodiment, the model for the face detection may output a result of segmenting an outline for defining the face in the image. In an exemplary embodiment, the model for the face detection may output a bounding box including the face in the image. In an additional exemplary embodiment, the model for the face detection may also be configured to jointly output an area corresponding to the face in the image, and a plurality of feature points which may identify the face in the area. In an additional exemplary embodiment, the model for the face detection may also be configured to jointly output the area corresponding to the face in the image, the plurality of feature points which may identify the face in the area, and a plurality of feature points which may identify an eye in the face.

In an exemplary embodiment, the computing device 100 may detect a face landmark on the detected face (320).

In an exemplary embodiment, the computing device 100 may obtain feature points included in the face of the driver on the face of the driver by using a model for detecting face landmark. In the present disclosure, the feature point and the landmark may be used interchangeably with each other.

In an exemplary embodiment, the model for detecting the face landmark may correspond to an artificial intelligence based model pre-trained to determine a plurality of feature points for identifying a feature (e.g., a feature of an eye, a feature of a nose, and/or a feature of a mouth) of the face on the face of the driver. In an additional exemplary embodiment, the model for detecting the face landmark may also be configured to jointly output the plurality of feature points which may identify the face in the face area, and the plurality of feature points which may identify the eye in the face.

In an exemplary embodiment, the model for detecting the face landmark may correspond to the detection model.

In an exemplary embodiment, an identity of the driver may be identified based on face landmark detection of the driver. The identification of the identity of the driver may be performed based on a comparison between a prestored face landmark of the driver and the detected face landmark of the driver.

In an exemplary embodiment, the computing device 100 may detect an eye landmark in the image (330).

As an example, the eye landmark detection may be more efficiently performed by using a face detection result. As an example, the eye landmark detection may be included in the face detection result. Based on the eye landmark detection, the computing device 100 may determine whether the driver is drowsy and/or the driver is distracted. For example, the eye landmark detection may detect a location of the eye in the face, whether the eye is closed, and/or a direction in which the eye looks.

As an example, the model for eye landmark detection may correspond to the detection model.

In an exemplary embodiment, the computing device 100 may detect an anomaly in the image (340).

In an exemplary embodiment, the computing device 100 may detect the anomaly in the image by using an eye landmark detection result. For example, the computing device 100 may determine whether a distraction (e.g., carelessness of looking forward) of the driver exists during a driving process by using the eye landmark detection result. For example, the computing device 100 may determine whether the driver is in a drowsy state during the driving process by using the eye landmark detection result.

In the present disclosure, the anomaly may be used to express an abnormal operation during the driving process. In the present disclosure, the anomaly may be used to express a situation and/or an operation which inhibits safety during the driving process. For example, the anomaly may include a first anomaly corresponding to no seatbelt, a second anomaly corresponding to distraction in a driving situation, a third anomaly corresponding to drowsiness in the driving situation, a fourth anomaly corresponding to smoking of the driver, a fifth anomaly corresponding to a fire in a vehicle, and/or a sixth anomaly corresponding to eye closing in the driving situation.

In an additional exemplary embodiment, the computing device 100 may detect a plurality of anomalies by using one model. In another exemplary embodiment, the computing device 100 may also operate to detect a plurality of anomalies by using a plurality of models (e.g., a model dedicated to specific anomaly detection).

In an additional exemplary embodiment, the computing device 100 may detect a body of the driver in the image. As an example, after the face of the driver is detected, the body of the driver may be detected in the image based on the face of the driver. As another example, the body detection of the driver may also be performed independently of the face detection of the driver. Whether the driver wear the seatbelt, whether the driver is smoking, and/or whether a hand of the driver is may be determined based on the body detection. Anomalies (e.g., no seatbelt, smoking, and/or fire in the vehicle) related to the body of the driver may be detected based on the body detection of the driver.

As an example, a model for detecting the body may correspond to the detection model.

In an additional exemplary embodiment, the computing device 100 may detect a plurality of anomalies by using one model. In another exemplary embodiment, the computing device 100 may also operate to detect a plurality of anomalies by using a plurality of models (e.g., a model dedicated to specific anomaly detection).

In an exemplary embodiment, the computing device 100 may determine whether there is an anomaly (e.g., distraction) corresponding to an input image by using a classification model using the eye detection result and/or the face detection result. As a non-limiting example, the classification model may operate to distinguish input image front or non-front. As a non-limiting example, the classification model may operate to output a quantitative value in which the input image faces the front or the non-front.

In an exemplary embodiment, the computing device 100 may determine an alarm corresponding to the anomaly by using the anomaly detection result (350).

In an exemplary embodiment, the alarm corresponding to the anomaly or the anomaly alarm may include various types of outputs for allowing the user to recognize the anomaly, such as sound, image, vibration, and/or light.

For example, when the computing device 100 determines that there is the anomaly in the image by using one or more models, the computing device 100 may determine whether to generate the alarm corresponding to the anomaly. When the anomaly detection leads directly to the anomaly alarm, there may be a problem in that an unnecessary alarm or an inaccurate alarm may be generated for the driver during the driving process. As a result, the technique according to an exemplary embodiment of the present disclosure determines whether to generate the anomaly alarm by using the anomaly detection result to provide a more optimized and more accurate alarm to the user. As an example, when there are/or a situation in which the distraction of the driver is detected, a situation in which the drowsiness of the driver is detected, and/or a situation in which the driver does not wear the seatbelt, it may be determined whether there is the anomaly.

For example, when the computing device 100 determines that there is the anomaly in the image, the computing device 100 may determine the type of alarm and/or the intensity of the alarm corresponding to the anomaly. The computing device 100 may also determine the intensity of the anomaly alarm in the image by using one or more models. For example, the computing device 100 compares a prediction result related to the anomaly with each of a plurality of thresholds to determine the intensities of a plurality of anomaly alarms or the intensity of the anomaly alarm. For example, the computing device 100 applies one or more counter concepts to the prediction results related to the anomaly to determine the intensities of the plurality of anomaly alarms or the intensity of the anomaly alarm by a method of comparing each of the counters and a threshold. As a result, the technique according to an exemplary embodiment of the present disclosure determines whether to generate the anomaly alarm by using the anomaly detection result, and/or determines the intensity of the anomaly alarm to provide the more optimized and more accurate alarm to the user. As an example, when there are/or a situation in which the distraction of the driver is detected, a situation in which the drowsiness of the driver is detected, and/or a situation in which the driver does not wear the seatbelt, it may be determined whether there is the anomaly. As such, as the type of alarm and/or the intensity of the alarm corresponding to the anomaly are/is controlled, a more intuitive and accurate alarm may be transferred to the user, so utilization of the DMS may be maximized.

Figure 4:
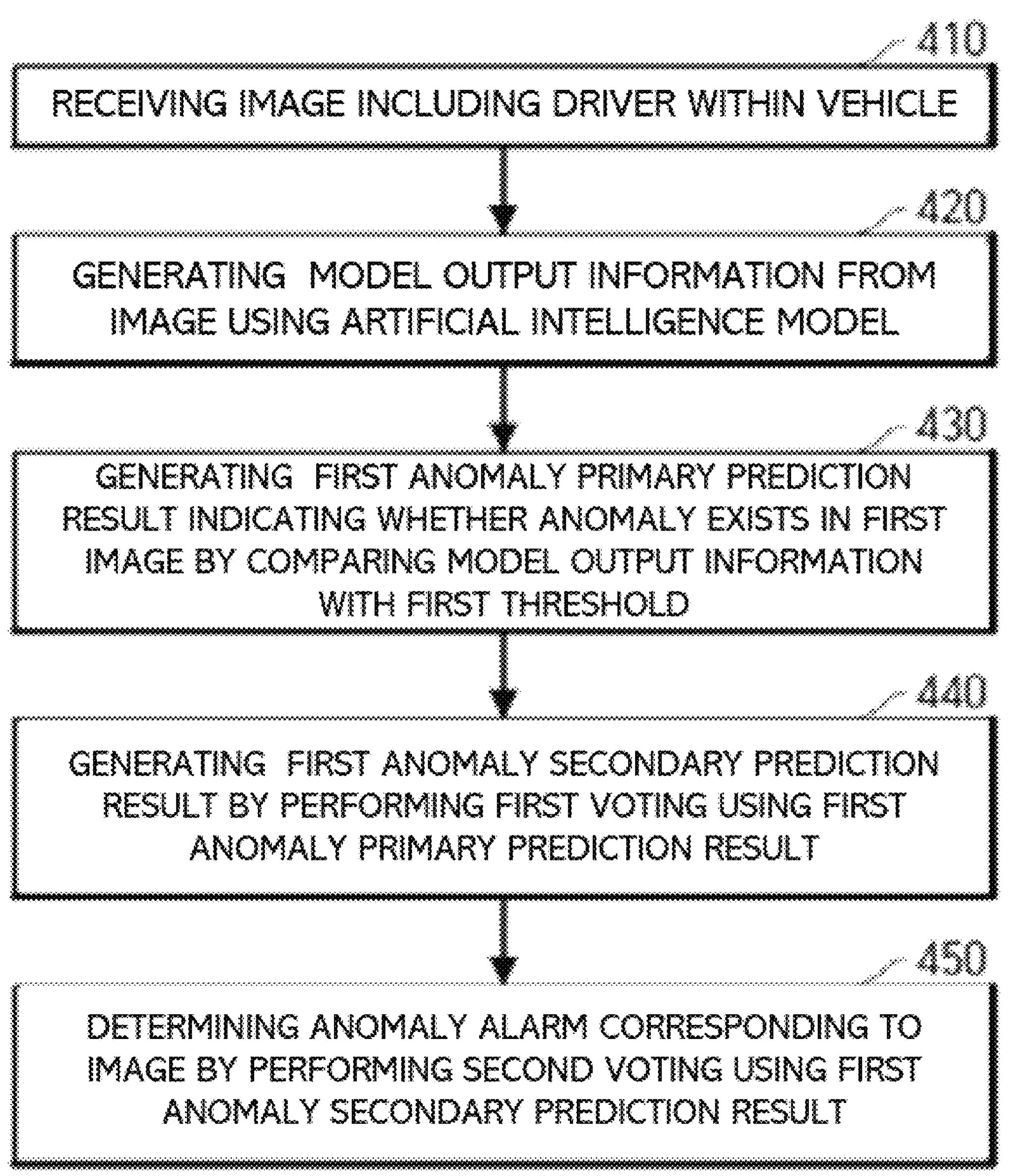
FIG. 4 exemplarily illustrates a method for determining the anomaly alarm in the DMS according to an exemplary embodiment of the present disclosure.

FIG. 4 exemplarily illustrates a method for determining whether the anomaly alarm is generated in the DMS according to an exemplary embodiment of the present disclosure.

In an exemplary embodiment, the computing device 100 may receive an image including the driver in the vehicle (410).

In an exemplary embodiment, an image (or first image) as an image including the driver may indicate a target image which becomes a target for determining the anomaly alarm.

In an exemplary embodiment, the image means an image obtained or received from the camera. In an exemplary embodiment, the image may mean an image obtained by photographing the driver by the camera installed in the vehicle. In an exemplary embodiment, the image may correspond to a target image which becomes a target for determining the alarm corresponding to no seatbelt. In an exemplary embodiment, the image may correspond to a target image which becomes a target for determining the alarm corresponding to distraction. In an exemplary embodiment, the image may correspond to a target image which becomes a target for determining the alarm corresponding to eye closing. In an exemplary embodiment, the image may correspond to a target image which becomes a target for determining the alarm corresponding to drowsiness.

The image in the present disclosure may be used as a meaning that encompasses one or more frames. For example, one image may correspond to one frame. For example, the image as a still image may correspond to a frame obtained from a moving picture. For example, the image may include a group of frames which are photographed multiple times.

In an exemplary embodiment, the image may correspond to an image or a frame photographed at a specific time. In an exemplary embodiment, the image may mean a still image or frame extracted or captured from a moving picture for the driver photographed by the camera.

In an exemplary embodiment, the computing device 100 may obtain a plurality of images or moving pictures obtained by the camera. The computing device 100 may obtain or extract a specific image (e.g., a specific frame) among the obtained images or moving pictures in order to determine the anomaly judgment or anomaly alarm. As an example, an image which becomes a target of the anomaly judgment or anomaly alarm judgment may correspond to a frame selected or determined among the plurality of frames. In such an example, the computing device 100 may extract the specific frame among the plurality of frames randomly or by the unit of a predetermined time period.

In an exemplary embodiment, the computing device 100 may generate model output information from the image by using an artificial intelligence model (420).

In an exemplary embodiment, the model may correspond to a deep learning-based model pre-trained to receive an image of the driver, and output an existence possibility of a predetermined object from the image of the driver. In such an exemplary embodiment, the model may output a possibility that the seatbelt will exist in the image and/or a wearing possibility of the seatbelt as model output information. In such an exemplary embodiment, the model may output an eye closing possibility and/or a drowsiness possibility as the model output information in the image. In such an exemplary embodiment, the model may output a distance between an upper portion and a lower portion of the eye in the image as the model output information. In such an exemplary embodiment, the model may output a front carelessness possibility and/or gaze information of the driver as the model output information in the image.

In another exemplary embodiment, the model may correspond to a deep learning-based model pre-trained to receive the image of the driver, and output a possibility that a predetermined anomaly inhibiting safety will exist in the image of the driver. The model may be pre-trained based on a training data set labeled with whether the anomaly being present in the image. The model may be pre-trained based on a training data set labeled with a possibility that the anomaly will be present in the image. The model may be pre-trained based on a training data set labeled with a location of the anomaly and/or the type of anomaly in the image. In an exemplary embodiment, an anomaly can be identified or predetermined either through preselected user input or automatically by the computing device (100). For example, the anomaly can be predefined or predetermined as a non-seatbelt-wearing event, distortion event, drowsiness event, fire event, and/or front-carelessness event. For example, the anomaly can be updated and added if the new type of anomaly event occurs.

In an exemplary embodiment, the model output information may include a value quantitatively indicating a possibility that a predetermine object(s) will be present in the image. For example, the model output information may include a detection score of the seatbelt in the image. For example, the model output information may include quantitative information related to detection of the seatbelt in the image. For example, the model output information may include an eye closing score in the image. For example, the model output information may include a score related to drowsiness in the image. For example, the model output information may include a score related to a distance between an upper portion and a lower portion of the eye in the image. For example, the model output information may include a score related to non-looking forward or distraction in the image.

In an exemplary embodiment, first model output information may include a value quantitatively indicating a possibility that the anomaly will be present in a first image. In an exemplary embodiment, the first model output information may also include a value indicating whether' that the anomaly exists in the first image. For example, the first model output information may include quantitative information related to non-detection of the seatbelt in the image. For example, the first model output information may include quantitative information related to eye closing of the driver in the image. For example, the first model output information may include quantitative information related to drowsiness of the driver in the image. For example, the first model output information may include quantitative information related to looking forward and non-looking forward of the driver or quantitative information related to distraction of the driver in the image.

In an exemplary embodiment, as the first image obtained from the camera is input into the artificial intelligence based model, the first model output information indicating a possibility that a predetermined object or a predetermined action will be present may be obtained in the first image.

In an exemplary embodiment, the model output information may mean an output of the model. For example, the model may generate model output information quantitatively indicating a presence possibility of the anomaly (e.g., no seatbelt, distraction, eye closing, and/or drowsiness) in the first image. For example, the model may generate model output information indicating whether the anomaly is present in the first image. For example, the model may generate model output information quantitatively indicating a possibility of a predetermined object or a predetermined action such as seatbelt, eye closing, drowsiness, tobacco, looking forward, and/or non-looking forward in the first image.

In an exemplary embodiment, the model output information may mean a result in which postprocessing is applied to the output of the model. In an exemplary embodiment, the model output information may mean a result of processing the output of the model. For example, the model may generate an output indicating a bounding box corresponding to the anomaly or a specific object, and/or anomaly possibility of the bounding box or a possibility to correspond to the specific object, and the computing device 100 may generate model output information indicating an anomaly possibility or whether there is the anomaly through postprocessing for the output of the model or indicating a detection possibility of the specific object. For example, the model may output a result related to detection of the seatbelt in the image, and the computing device 100 may generate a result related to wearing or non-wearing of the seatbelt of the driver from the result. For example, the model may output a result corresponding to the face, and the computing device 100 may calculate a yaw value and/or a pitch value from the result corresponding to the face, and generate model output information indicating whether there is the distraction or a distraction possibility based on the calculated yaw value and pitch value. For example, when the model outputs a result of detecting an object in a first space, the computing device 100 generates a transform result by transforming the result into a transformed space to generate model output information indicating whether there is drowsiness or a drowsiness possibility.

In an exemplary embodiment, the model output information may be determined for each image (e.g., for each frame).

In an exemplary embodiment, the computing device 100 compares first model output information and a first threshold to generate a primary prediction result of a first anomaly indicating whether the anomaly exists in a first image (430).

In an exemplary embodiment, the computing device 100 may compare the first model output information and a predetermined threshold for anomaly judgment. In an exemplary embodiment, the first model output information may include a quantitative value for comparison with a threshold. In an exemplary embodiment, the threshold may indicate a variable threshold which is changeable for each of images to be compared. In an exemplary embodiment, the above-described threshold may be dynamically changed based on other information.

In an exemplary embodiment, the computing device 100 may generate or obtain the primary prediction result of the first anomaly indicating whether the anomaly exists in the first image based on the result of the comparison. For example, the primary prediction result of the first anomaly may be generated or obtained through comparison between the output of the model or the quantitative value of processing the output of the model with a threshold. The primary prediction result of the first anomaly may have a value indicating whether there is the anomaly in the corresponding image. For example, the primary prediction result of the first anomaly may have a value of 1 when there is the anomaly and a value of 0 when there is no anomaly, or vice versa according to an implementation aspect. In such an example, when the first model output information has a value of 0.7 and the threshold has a value of 0.6, the primary prediction result of the first anomaly may be set to have the value of 1 indicating that there is the anomaly. When the first model output information has a value of 0.5 and the threshold has a value of 0.6, the primary prediction result of the first anomaly may be set to have the value of 0 indicating that there is no anomaly. In an exemplary embodiment, the primary prediction result of the first anomaly may be determined for each image (e.g., for each frame). For example, the primary prediction result of the first anomaly may be set to have the value of 1 when the seatbelt is not detected, and the value of 0 when the seatbelt is detected. For example, the primary prediction result of the first anomaly may be set to have the value of 0 when the eye closing is not detected, and the value of 1 when the eye closing is detected. For example, the primary prediction result of the first anomaly may set to have the value of 0 when the drowsiness is not detected, and the value of 1 when the drowsiness is detected. For example, the primary prediction result of the first anomaly may set to have the value of 0 when the front carelessness is not detected, and the value of 1 when the front carelessness is detected. In such an example, the first model output information may be set to have a higher value as the possibility that the seatbelt will not be detected is higher. In such an example, the first model output information may be set to have a higher value as the possibility that the eye closing, the drowsiness, and/or the front carelessness will be detected is higher.

The technique according to an exemplary embodiment of the present disclosure dynamically controls the threshold to be compared with the model output information by various methods to ensure the accuracy and reliability for the output of the model.

In an exemplary embodiment, the first threshold may be determined based on at least one previous anomaly primary prediction result corresponding to at least one previous image obtained prior to the first image. In an exemplary embodiment, the first threshold to be compared with the first model output information may be determined based on second model output information generated by the model in response to a second image obtained prior to the first image. In an exemplary embodiment, the first threshold to be compared with the first model output information may be changed based on a threshold for anomaly judgment of the second image obtained immediately prior to the first image based on the previous anomaly primary prediction result or previous model output information. A current threshold corresponding to a current image may be variable between comparison between the previous image and the previous threshold. For example, when the model output information of the previous image exceeds the previous threshold, the current threshold corresponding to the current image may be determined as a low threshold among a plurality of threshold options, or decreased from the previous threshold. For example, when the model output information of the previous image does not exceed the previous threshold, the current threshold corresponding to the current image may be determined as a high threshold among the plurality of threshold options, or increased from the previous threshold.

In an additional exemplary embodiment, the first threshold to be compared with the first model output information may be determined based on comparison between anomaly primary prediction results obtained from the previous image and a specific threshold. The specific threshold may be considered as a threshold for determining another threshold. In such an exemplary embodiment, in determining the current threshold of the current image, the computing device 100 compares a ratio value of the value of 1 in a plurality of previous anomaly primary prediction results (e.g., having the value of 0 or 1) corresponding to a plurality of previous images, and a specific threshold, and compares a ratio value of the value of 0 and the specific threshold to determine what a primary prediction result exceeding the specific threshold is. The computing device 100 may determine to set the threshold to a low value among the plurality of threshold options or decrease the threshold based on the previous threshold, when the primary prediction result exceeding the specific threshold is 1. The computing device 100 may determine to set the threshold to a high value among the plurality of threshold options or increase the threshold based on the previous threshold, when the primary prediction result exceeding the specific threshold is 0. The computing device 100 may determine to maintain the threshold when the primary prediction result exceeding the specific threshold is neither 0 nor 1.

In an exemplary embodiment, a change range of the threshold may be predetermined. The threshold may be sequentially increased, or sequentially decreased, or maintained by a counter scheme based on the prediction result of the previous image(s). The increase or decrease of the threshold may be made within the change range of the threshold.

In an additional exemplary embodiment, the first threshold to be compared with the first model output information may also be determined based on an anomaly secondary prediction result of the previous image. In such an exemplary embodiment, when the anomaly secondary prediction result of the previous image is 1, the threshold of the current image may be decreased compared to the previous threshold or set to the low value among the plurality of threshold options. When the anomaly secondary prediction result of the previous image is 0, the threshold of the current image may be increased compared to the previous threshold or set to the high value among the plurality of threshold options.

In an exemplary embodiment, an expression "determined based on specific information" may include a case where the size of the threshold may be quantitatively changed according to the size of a value of the specific information and/or the type of value. The computing device 100 may obtain a plurality of images depending on the time. An anomaly primary prediction result for each of the plurality of images may be obtained. For example, a second anomaly primary prediction result corresponding to the second image obtained prior to the first image may be obtained, and the first anomaly primary prediction result corresponding to the first image may be obtained. In such an example, the first threshold used to obtain the first anomaly primary prediction result corresponding to the first image may be determined based on the second anomaly primary prediction result corresponding to the second image. For example, the first threshold may be changed according to the second anomaly primary prediction result. For example, the first threshold may be determined as a predetermined value such as 0.3 when the second anomaly primary prediction result is 1 and 0.5 when the second anomaly primary prediction result is 0.

In an exemplary embodiment, a reference value to be varied herein may be a threshold corresponding to the second image obtained immediately prior to the first image. As an example, when the second anomaly primary prediction result includes a result in which there is the anomaly, the first threshold corresponding to the first image subsequent to the second image may be set to be increased compared to a past threshold (e.g., a threshold corresponding to the second image). When the size of the threshold is increased, it may be determined that the anomaly exists in the first image only when the quantitative value of the model output information corresponding to the image should have a relatively high value. As an example, when the second anomaly primary prediction result includes a result in which there is no anomaly, the first threshold corresponding to the first image subsequent to the second image may be set to be decreased compared to the past threshold. When the size of the threshold is decreased, it may be determined that the anomaly exists in the first image even though the quantitative value of the model output information corresponding to the image is relatively low.

In an additional exemplary embodiment, the first threshold to be compared with the first model output information may be changed based on second model output information corresponding to the second image obtained prior to the first image. For example, the first threshold may have a negative correlation with the value of the model output information of the previous image. In such an example, when the model output information of the previous image is relatively large, the size of the first threshold may be set to be decreased. When the model output information of the previous image is relatively small, the size of the first threshold may be set to be increased.

In an exemplary embodiment, the first threshold may be determined based on a second anomaly primary prediction result obtained by comparing a second threshold determined based on a third anomaly primary prediction result corresponding to a third image obtained prior to the second image, and the second model output information. Here, the second threshold may be a threshold for determining whether there is the anomaly in the second image.

As such, the technique according to an exemplary embodiment of the present disclosure may dynamically control a threshold for anomaly prediction or judgment of the current image by using an anomaly related result corresponding to the previous image with respect to each of a plurality of sequential images. The accuracy and/or reliability for the output of the model may be increased through the control of the threshold.

In an exemplary embodiment, the first threshold may be determined based on a ratio of a result value indicating the existence of the anomaly in the previous anomaly primary prediction results corresponding to a predetermined first number of images obtained prior to the first image. For example, when the ratio of the result value indicating the existence of the anomaly is equal to or more than a first ratio in the previous anomaly primary prediction results (e.g., a plurality of anomaly primary prediction results), the first threshold may be set to a first value, and when the ratio of the result value indicating the existence of the anomaly is less than the first ratio in the previous anomaly primary prediction results, the first threshold may be set to a second value higher than the first value.

In an exemplary embodiment, the first threshold may be determined or changed according to which result value of a result value indicating the existence of the anomaly and a result value indicating non-existence of the anomaly among the previous anomaly primary prediction results corresponding to a first number of images predetermined, which are obtained prior to the first image is a majority value. For example, when the majority value of the previous anomaly primary prediction results is the value indicating the existence of the anomaly, the first threshold corresponding to the current image may be set to be decreased. For example, when the majority value of the previous anomaly primary prediction results is the value indicating the non-existence of the anomaly, the first threshold corresponding to the current image may be set to be increased.

In an exemplary embodiment, the model output information corresponding to each of the plurality of sequentially obtained images may be structuralized in a form of a queue. For example, one queue may be constituted by a predetermined number of units. For example, the first model output information corresponding to the first image may be allocated to a first unit included in one queue, the second model output information corresponding to the second image may be allocated to a second unit, and third model output information corresponding to a third image may be allocated to a third unit.

In an exemplary embodiment, the anomaly primary prediction results corresponding to the plurality of sequentially obtained images, respectively may be structuralized in the form of the queue. The respective value corresponding to one image may be allocated to the same location in a plurality of queues. A queue constituted by the anomaly primary prediction results and a queue constituted by the model output information may have locations corresponding to each other with respect to one image. For example, the first image obtained at a first time may be allocated to each of the same locations in a first queue constituted by the model output information and a second queue constituted by the anomaly primary prediction results.

In an exemplary embodiment, one queue may be constituted by a predetermined number of units. For example, the predetermined number of units of one queue may include data corresponding to images obtained according to the flow of the time. For example, the first anomaly primary prediction result corresponding to the first image may be allocated to the first unit included in one queue, the second anomaly primary prediction result corresponding to the second image may be allocated to the second unit, and the third anomaly primary prediction result corresponding to the third image may be allocated to the third unit. In such an example, a threshold to be compared with a model output result corresponding to a current image currently obtained may be determined based on a ratio of a result value indicating the existence of the anomaly among the first anomaly primary prediction result, the second anomaly primary prediction result, and the third anomaly primary prediction result included in one queue. For example, when both the first anomaly primary prediction result and the second anomaly primary prediction result include the result value indicating that the anomaly exists, and the third anomaly primary prediction result includes a result value indicating that there anomaly does not exist, the ratio of the result value may have a value of ($\frac{2}{3}\times 100$). By comparing the ratio of the result value with a specific threshold, the threshold corresponding to the current image may be determined or changed. The ratio indicating the existence of the anomaly in the previous anomaly prediction results and the size of the threshold corresponding to the current image may have a negative correlation. In the present disclosure, an expression "the first value and the second value have the negative correlation" may indicate that when the first value increases, the second value tends to decrease. In the present disclosure, the expression "the first value and the second value have the negative correlation" may indicate that when the first value becomes relatively larger, the second value becomes relatively smaller.

In an exemplary embodiment, the computing device 100 performs a first voting by using the first anomaly primary prediction result to generate a first anomaly secondary prediction result (440).

In an exemplary embodiment, the first anomaly secondary prediction result may indicate a quantitative value used as a parameter for determining an anomaly alarm corresponding to the first image. In another exemplary embodiment, the first anomaly secondary prediction result may have a value used as a parameter for determining whether the anomaly alarm corresponding to the first image is to be generated, and indicating whether the anomaly exists.

In an additional exemplary embodiment, the first threshold used for anomaly prediction of the first image may also be determined based on a secondary anomaly secondary prediction result corresponding to the second image obtained prior to the first image.

In an exemplary embodiment, the first voting may be used for correcting the accuracy and/or reliability of the output of the model. In an exemplary embodiment, the first voting may use the anomaly primary prediction results of the previous images obtained prior to the first image and the anomaly primary prediction result of the currently obtained first image.

In an exemplary embodiment, the first voting may include a process of determining what the majority value of the anomaly primary prediction results corresponding to the sequential images is. In an exemplary embodiment, the first voting may include a process of determining a ratio of the anomaly primary prediction results corresponding to the sequential images. In an exemplary embodiment, the first voting may include a process of comparing the ratio of the anomaly primary prediction results corresponding to the sequential images and a predetermined threshold.

In an exemplary embodiment, the first voting may use values on a voting queue constituted by a plurality of units corresponding to the sequential images. The values herein are the anomaly primary prediction results corresponding to the sequential images. For example, the first anomaly primary prediction result corresponding to the first image may be allocated to the first unit included in the voting queue, the second anomaly primary prediction result corresponding to the second image may be allocated to the second unit, and the third anomaly primary prediction result corresponding to the third image may be allocated to the third unit. Here, the first image may corresponding to an image obtained at a latest time or the current image, the second image may be the image obtained prior to the first image, and the third image may be the image obtained prior to the second image.

In an exemplary embodiment, a plurality of voting queues may exist. For example, among the voting queues, a first voting queue may include model output information obtained according to the time, a second voting queue may include primary prediction results obtained according to the time, and a third voting queue may include secondary prediction results obtained according to the time.

In an exemplary embodiment, the first anomaly secondary prediction result corresponding to the first image may be determined based on what the majority value of the first anomaly primary prediction result, the second anomaly primary prediction result, and the third anomaly primary prediction result is.

In an exemplary embodiment, the first anomaly secondary prediction result corresponding to the first image may be determined based on comparison between a ratio at which the result value indicting the anomaly occupies among the first anomaly primary prediction result, the second anomaly primary prediction result, and the third anomaly primary prediction result, and a specific threshold. For example, when the first anomaly primary prediction result indicates the existence of the anomaly, the second anomaly primary prediction result indicates the existence of the anomaly, and the third anomaly primary prediction result indicates the non-existence of the anomaly, the first anomaly secondary prediction result corresponding to the first image may be set to the majority value of three anomaly primary prediction results or the value (e.g., 1) indicating the existence of the anomaly which is a representative value thereof. As a result, the first unit corresponding to the first image in the queue constituted by the anomaly secondary prediction results may have the value of 1. For example, when the first anomaly primary prediction result indicates the non-existence of the anomaly, the second anomaly primary prediction result indicates the existence of the anomaly, and the third anomaly primary prediction result indicates the non-existence of the anomaly, the first anomaly secondary prediction result corresponding to the first image may be set to the majority value of three anomaly primary prediction results or the value (e.g., 0) indicating the non-existence of the anomaly which is a representative value thereof. As a result, the first unit corresponding to the first image in the queue constituted by the anomaly secondary prediction results may have the value of 0.

In an exemplary embodiment, the anomaly secondary prediction results corresponding to the plurality of sequentially obtained images, respectively may be structuralized in a form of the voting queue. The respective value corresponding to one image may be allocated to the same location in the plurality of queues. A queue constituted by the anomaly secondary prediction results, a queue constituted by the anomaly primary prediction results, and a queue constituted by the model output information may have locations corresponding to each other with respect to one image. For example, a value related to the anomaly prediction of the first image obtained at the first time may be allocated to each of the same locations (e.g., the locations corresponding to each other) in the queue constituted by the model output information, the queue constituted by the anomaly primary prediction results, and the queue constituted by the anomaly secondary prediction results.

The first voting according to an exemplary embodiment of the present disclosure may generate a group anomaly prediction result representing an image group constituted by the first image, and a second number of images predetermined, which are obtained prior to the first image in order to ensure the accuracy of the first model output information. The group anomaly prediction result may mean a result representing the anomaly primary prediction results corresponding to a plurality of images including the first image.

In an exemplary embodiment, the computing device 100 may determine a majority value of the anomaly primary prediction results corresponding to the first image, and the second predetermined number of images obtained prior to the first image, respectively, and generate the first anomaly secondary prediction result by using the determined majority value. As an example, the majority value may be determined as a result value occupying a higher ratio between the result value indicating the existence of the anomaly and the result value indicating the non-existence of the anomaly in the anomaly primary prediction results.

As another example, the majority value may be determined by comparing the result values which exist in the anomaly primary prediction results and a predetermined second threshold. For example, when the second threshold is 45%, and a ratio of a specific result value among the anomaly primary prediction results is 50%, the anomaly secondary prediction result may be set to the specific result value.

As described above, the technique according to an exemplary embodiment of the present disclosure performs the first voting using the anomaly primary prediction result to further enhance the reliability and accuracy of the anomaly judgment result.

In an exemplary embodiment, the anomaly secondary prediction result may include a quantitative value used as a parameter for determining the anomaly alarm corresponding to the obtained image. For example, the anomaly secondary prediction result may include a counter value. For example, in a situation in which a second anomaly secondary prediction result corresponding to the second image obtained prior to the first image has a value of 2, the value of 1 may be determined to be added according to the result of the first voting corresponding to the first image. In this case, a value of 2+1=3 may be included in the first anomaly secondary prediction result corresponding to the first image. In another example, in the situation in which the second anomaly secondary prediction result corresponding to the second image obtained prior to the first image has the value of 2, the value of 1 may be determined to be decreased according to the result of the first voting corresponding to the first image. In this case, a value of 2−1=1 may be included in the first anomaly secondary prediction result corresponding to the first image.

In an exemplary embodiment, a unit of the increased or decreased counter value may be determined based on a difference between acquisition times of images. For example, when the first image is obtained after 500 ms from an acquisition time of the second image in a state in which a counter value corresponding to the second image is 0.7, and it is determined that the value is added according to the result of the first voting corresponding to the first image, the counter value corresponding to the first image may be set to 0.7+0.5=1.2.

In an exemplary embodiment, the first anomaly secondary prediction result may be compared with a predetermined counter threshold. For example, when the counter value corresponding to the first anomaly secondary prediction result is equal to or more than the predetermined counter threshold, the computing device 100 may determine to generate an alarm (e.g., turning on the alarm). For example, when the counter value corresponding to the first anomaly secondary prediction result is changed to a value less than the counter threshold in a state in which a counter value corresponding to the second anomaly secondary prediction result is equal to or more than the counter threshold, the computing device 100 may determine to turn off the alarm.

In an exemplary embodiment, the first anomaly secondary prediction result may include a plurality of counters. As the plurality of counters are included as such, a plurality of types of alarms may be generated. For example, a first counter and a second counter may be included in the first anomaly secondary prediction result. According to the result of the first voting, values corresponding to the first counter and the second counter may be independently changed. The first counter and the second counter are compared with a first counter threshold and a second counter threshold pre-allocated, respectively, and when the counter value is equal to or more than the counter threshold, alarms corresponding to the respective counters may be generated. As an example, each of the counters may have predefined ranges of a minimum value and a maximum value, and when the counter deviates from the minimum value and the maximum value according to the result of the first voting, the value of the counter may be set to have the minimum value and the maximum value.

In an exemplary embodiment, the first anomaly secondary prediction result may be configured to generate the plurality of alarms as being compared with a plurality of counter thresholds. For example, a first counter value corresponding to the first image may be compared with each of a first counter threshold and a second counter threshold. When any one of the counter thresholds is satisfied, a first alarm corresponding to the corresponding counter threshold may be generated. When the other one of the counter thresholds is satisfied, a second alarm corresponding to the corresponding counter threshold may be generated.

In an exemplary embodiment, the computing device 100 performs a second voting by using the first anomaly secondary prediction result to determine an anomaly alarm corresponding to the first image (450).

In the present disclosure, the first voting may adopt the previous anomaly primary prediction result corresponding to at least one previous image obtained prior to the first image which becomes a target of the anomaly judgment, and the first anomaly primary prediction result corresponding to the first image. The second voting may adopt the previous anomaly secondary prediction result corresponding to the at least one previous image, and the first anomaly secondary prediction result corresponding to the first image.

In an exemplary embodiment, the second voting may be performed subsequently to the first voting. In an exemplary embodiment, the second voting may adopt the result of the first voting.

In an exemplary embodiment, the second voting may judge whether anomaly judgment results of a predetermined number of images have continuity. In an exemplary embodiment, when the anomaly judgment results of a predetermined number of images have continuity as the value indicating that the anomaly exists, the second voting may determine to generate the anomaly alarm.

In an exemplary embodiment, the second voting may determine an image group constituted by a first image corresponding to a current image, and sequential images obtained prior to the first image in order to ensure the accuracy of the generation of the anomaly alarm. The second voting may determine whether anomaly secondary prediction results corresponding to the images constituting the image group have the continuity. The second voting is a process using whether the anomaly secondary prediction results have the continuity. For example, when all of the anomaly secondary prediction results in the image group constituted by the sequential images including the first image indicate the existence of the anomaly, the computing device 100 may determine to generate the anomaly alarm corresponding to the first image. For example, when some of the anomaly secondary prediction results in the image group constituted by the sequential images including the first image indicate the existence of the anomaly and some others indicate the non-existence of the anomaly, the computing device 100 may determine that the anomaly secondary prediction results have no continuity.

For example, it is assumed that a reference number for judging the continuity is 3. Under such an assumption, if any of the first anomaly secondary prediction result, the second anomaly secondary prediction result, and the third anomaly secondary prediction result corresponding to three sequential images including the first image which becomes a target of the anomaly judgment currently do not indicate the existence of the anomaly, the result value of the anomaly alarm corresponding to the first image may be set to 0 through the second voting. In such an example, the anomaly alarm will not be generated for the currently obtained first image.

In an exemplary embodiment, the second voting may include comparison between the anomaly secondary prediction result including the counter value and a counter threshold. For example, it is assumed that the counter threshold is 3. In such an example, when the anomaly secondary prediction result reaches 3, an alarm corresponding to the corresponding counter threshold may be turned on. Further, the anomaly secondary prediction result is changed from 3 to 2, the alarm may be turned off. As described above, the second voting may be performed in a form of comparing the plurality of counter values and the counter thresholds, respectively. The second voting may be performed in a form of comparing one counter value and each of the plurality of counter thresholds.

As described above, the technique according to an exemplary embodiment of the present disclosure may use one or more votings in order to generate the alarm corresponding to the anomaly. As one or more votings are used, sensitivity, accuracy, and reliability of an alarm corresponding to an anomaly situation may be all enhanced.

Figure 5:
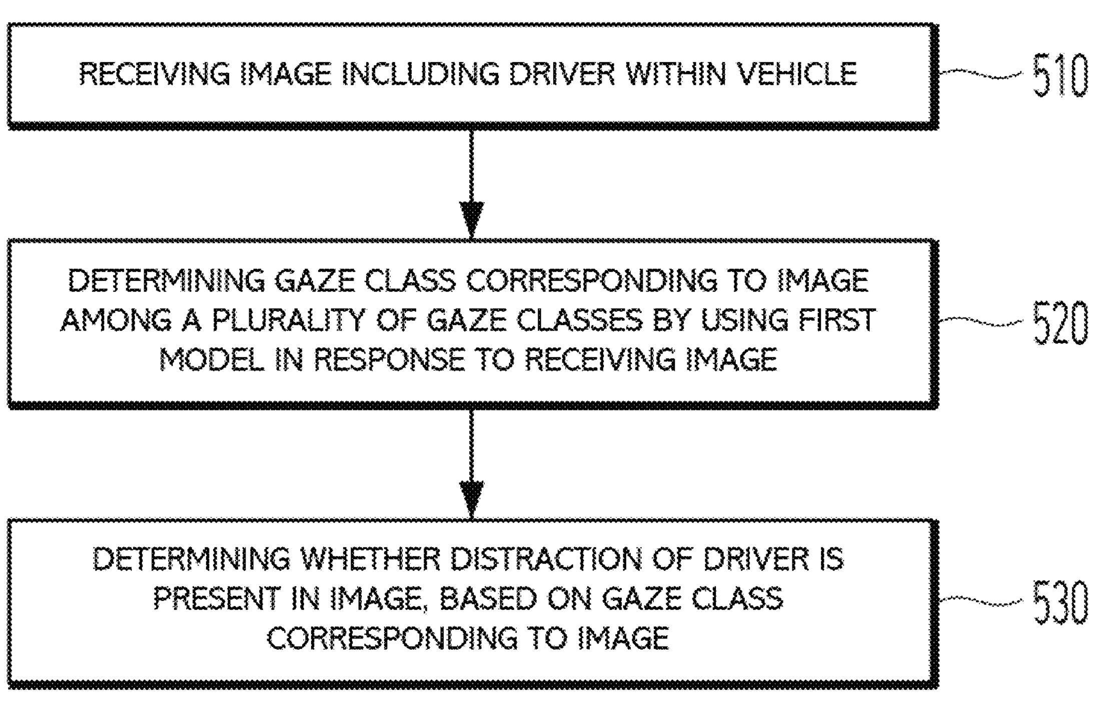
FIG. 5 exemplarily illustrates a method for determining distraction of a driver according to an exemplary embodiment of the present disclosure.

FIG. 5 exemplarily illustrates a method for determining distraction of a driver according to an exemplary embodiment of the present disclosure.

In an exemplary embodiment, the computing device 100 may receive an image including a driver within a vehicle (510).

In an exemplary embodiment, the computing device 100 may receive an image including a face of the driver within the vehicle.

In an exemplary embodiment, the image means an image received from a camera. In an exemplary embodiment, the image may mean an image obtained by photographing the driver by the camera installed within the vehicle.

In an exemplary embodiment, the image may correspond to an image or a frame photographed at a specific time. In an exemplary embodiment, the image may mean a still image or frame extracted or captured from a moving picture for the driver photographed by the camera.

In an exemplary embodiment, the computing device 100 may receive a plurality of images or moving pictures received by the camera. The computing device 100 may receive or extract a specific image (e.g., a specific frame) among the received images or moving pictures in order to judge the gaze of the driver or judge the distraction of the driver. As an example, an image which becomes a target of the distraction may correspond to a frame selected or determined among the plurality of frames. In such an example, the computing device 100 may extract the specific frame among the plurality of frames randomly or by the unit of a predetermined time period.

In the present disclosure, the image including the face of the driver may include, for example, an image in which the face of the driver is represented by a bounding box, an image in which an outline of the face of the driver is segmented, an image including the face of the driver, and/or an image in which feature points of the face of the driver are represented.

In an exemplary embodiment, the computing device 100 may determine a gaze class corresponding to the image among a plurality of gaze classes by using a first model in response to the receiving of the image (520).

In an exemplary embodiment, the first model may correspond to a pre-trained artificial intelligence-based model. The first model may correspond to an artificial intelligence model pre-trained by using a training dataset generated based on clustering of reference images that satisfy a condition in which a driving speed of the vehicle is equal to or higher than a predetermined threshold speed among the plurality of images. Here, the driving speed of the vehicle may be mapped to the image. The reference image may mean an image that satisfies a condition according to the mapped driving speed. For example, the reference image may mean an image in which the driving speed is equal to or higher than the predetermined threshold speed. For example, the reference image may mean an image in which the driving speed of the vehicle at the receiving time is equal to or higher than 30 km/h.

In an exemplary embodiment, the first model may be trained to output, in response to an input related to an image or an input related to a face angle in the image, a gaze class to which the image or the face angle belongs. In an exemplary embodiment, the first model may be trained to output, in response to the input related to the image or the input related to the face angle in the image, a distance between the image or the face angle, and a plurality of clusters (groups).

In an exemplary embodiment, the gaze class may include a first gaze class in which the driver is gazing in a front direction, and a second gaze class in which the driver is gazing in a non-front direction. In the present disclosure a range of an angle which may be identified to head to a movement direction of the vehicle based on a driver seat may be defined as a front. In the present disclosure, a predetermined angle range using the movement direction of the vehicle as a reference axis may be defined as the front. The front may encompass a 2-dimensional angle range or a 3-dimensional angle range. In the present disclosure, an angle range which deviates from the angle range of the front may be defined as a non-front.

In an exemplary embodiment, the computing device 100 extracts a yaw value and a pitch value from an input image, and calculates a distance between a combination of the extracted yaw value and pitch value, and a clustering result of the reference images to determine a gaze class (e.g., the front or the non-front) corresponding to the input image. For example, a gaze angle may be determined through the combination of the yaw value and the pitch value. For example, the computing device 100 calculates the distance to determine a gaze cluster closest to the combination of the yaw value and the pitch value among a plurality of gaze clusters. The gaze class of the image may be determined as a gaze class to which the gaze cluster belongs. The gaze clusters herein may be generated by clustering or grouping the reference images by using a gaze angle of the driver in the reference images. In the present disclosure, clustering or grouping may be used interchangeably with each other. In the present disclosure, the cluster and the group may be used interchangeably with each other.

In an exemplary embodiment, the first model may correspond to a classification model. When the yaw value and the pitch value are input by using the first model, the computing device 100 may operate by distinguishing the front or the non-front based on the input values.

In the present disclosure, the distraction and front carelessness may be used interchangeably with each other.

In an exemplary embodiment, the computing device 100 may determine whether the distraction of the driver is present in the image based on the gaze class corresponding to the image (530).

For example, the computing device 100 may determine the gaze class corresponding to the input image, and determine whether the distraction of the driver is present according to the type of gaze class. In such an example, when the gaze class corresponding to the input image is determined as the first gaze class indicating the front, the computing device 100 may determine that the distraction of the driver is not present. In such an example, when the gaze class corresponding to the input image is determined as the second gaze class indicating the non-front, the computing device 100 may determine that the distraction of the driver is present.

For example, the computing device 100 may extract the yaw value and the pitch value from the input image, and determine whether the distraction of the driver is present in the input image by using a distance between a gaze cluster corresponding to the input image among the plurality of gaze clusters, and the extracted yaw value and pitch value.

For example, the computing device 100 may set a distraction likelihood of the driver higher as a distance between at least one cluster which belongs to the first gaze class indicating the front, and the yaw value and the pitch value extracted from the input image is larger. For example, the computing device 100 may set the distraction likelihood of the driver lower as the distance between at least one cluster which belongs to the first gaze class indicating the front, and the yaw value and the pitch value extracted from the input image is smaller.

For example, the computing device 100 may set a distraction likelihood of the driver higher as a distance between at least one cluster which belongs to the second gaze class indicating the non-front, and the yaw value and the pitch value extracted from the input image is smaller. For example, the computing device 100 may set the distraction likelihood of the driver lower as the distance between at least one cluster which belongs to the second gaze class indicating the non-front, and the yaw value and the pitch value extracted from the input image is larger.

Figure 6:
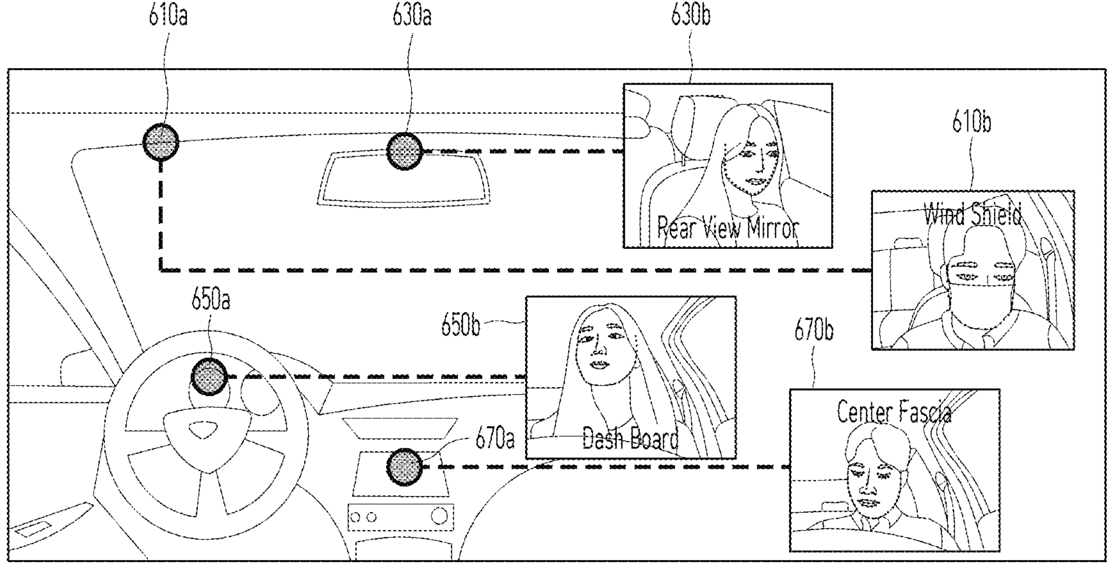
FIG. 6 exemplarily illustrates a gaze angle according to an installation position of a camera in the DMS.

FIG. 6 exemplarily illustrates a gaze angle according to an installation position of a camera in the DMS.

A camera product for implementing a DMS operation may be installed at various positions 610*a*, 630*a*, 650*a*, and 670*a* within the vehicle.

Reference numeral 610*a* represents a position of a front wind shield within the vehicle. When the camera is installed at the position of reference numeral 610*a*, the same image of the driver as reference numeral 610*b* may be received.

Reference numeral 630*a* represents a position of a rear view mirror within the vehicle. When the camera is installed at the position of reference numeral 630*a*, the same image of the driver as reference numeral 630*b* may be received.

Reference numeral 650*a* represents a position of a dashboard within the vehicle.

When the camera is installed at the position of reference numeral 650*a*, the same image of the driver as reference numeral 650*b* may be received.

Reference numeral 650*a* represents a position of a dash board within the vehicle. When the camera is installed at the position of reference numeral 650*a*, the same image of the driver as reference numeral 650*b* may be received.

Reference numeral 670*a* represents a position of a center fascia within the vehicle. When the camera is installed at the position of reference numeral 670*a*, the same image of the driver as reference numeral 670*b* may be received.

As described above, the gaze angle of the driver in the image may be determined differently according to the installation position of the camera. In particular, when a DMS product for an after market is used, of which installation position within the vehicle may not be specified, a reference front position of the driver may not be determined, so it may be difficult to set a reference for determining the distraction of the driver.

A technique according to an exemplary embodiment of the present disclosure may achieve a technical effect that may efficiently distinguishing a front gaze and a non-front gaze from the image of the driver even in a situation in which the installation position of the camera my not be specified.

FIG. 7 exemplarily illustrates a method for collecting training data for training a model according to an exemplary embodiment of the present disclosure.

In an exemplary embodiment, the computing device 100 may receive an image of a driver photographed within a vehicle being driven. The computing device 100 may use a fact that there is high likelihood that an angle viewed by the driver will be the front at a driving speed equal to or higher than a predetermined reference speed. The computing device 100 determines an image of such a condition among collected images to construct training data of a model for detecting the distraction of the driver.

As illustrated in FIG. 7, images of the driver having various driving speeds may be collected. A 2-dimensional space in FIG. 7 indicates a gaze angle of the driver in the collected images. For example, in the 2-dimensional space, an X axis or a horizontal axis may indicate the yaw value and a Y axis or a vertical axis may indicate the pitch value. The gaze angle of the driver may be determined based on a combination of the yaw value and the pitch value. For example, the gaze angle may indicate a 2-dimensional vector received according to the yaw value and the pitch value.

In an exemplary embodiment, the computing device 100 may map the collected image to the 2-dimensional space by using yaw values and pitch values of the respective collected images. The computing device 100 may map the collected image to the 2-dimensional space by using gaze angles of the respective collected images. One point represented on the 2-dimensional space may correspond to one image.

In an exemplary embodiment, a driving speed of the vehicle may be determined, which corresponds to a receiving time of each of the collected images. The determined driving speed may be mapped to each of the collected images. For example, when a specific image is received, a driving speed of the vehicle at a receiving time of the corresponding image may be received jointly. For example, the driving speed for each of the images may be stored jointly with the image.

In an exemplary embodiment, the computing device 100 may distinguish an image in which the driving speed of the vehicle is higher than a predetermined reference speed and an image in which the driving speed of the vehicle is equal to or lower than the predetermined reference speed. In FIG. 7, it exemplified that the reference speed is 30 km/h. Reference numeral 710 (710*a* and 710*b*) represents images in which the driving speed of the vehicle is equal to or lower than the reference speed. Reference numerals 720, 730, and 740 represent images in which the driving speed is higher than the reference speed.

In an exemplary embodiment, the computing device 100 clusters reference images in which the driving speed is higher than the reference speed to allocate the reference images to a plurality of clusters. When images (or reference images) of a number of a predetermined reference value or more are collected, the computing device 100 may cluster the collected reference images, and then determine gaze angles occupying a ratio equal to or higher than a predetermined reference ratio to a total number as a front cluster. The computing device 100 may cluster the collected reference images, and then determine gaze angles occupying a ratio lower than the predetermined reference ratio to the total number as the non-front cluster.

In the example of FIG. 7, 62 images are collected, and mapped to the 2-dimensional space. Among the images, images 710 (710*a* and 710*b*) in which the driving speed is equal to or lower than the reference speed do not satisfy a clustering reference, so the corresponding images 710 (710*a* and 710*b*) may be excluded from a clustering target. Except for the images 710 (710*a* and 710*b*) in which the driving speed is equal to or lower than the reference speed, a total of 46 reference images are collected. Clustering the reference images may be performed. The clustering may include grouping points of the 2-dimensional space into a plurality of groups based on the combination of the yaw value and the pitch value, and or the face angle. The computing device 100 may generate the plurality of groups or clusters 720, 730, and 740 according to a clustering result for the reference images. The computing device 100 may determine quantitative values of images (e.g., reference images) included in the clusters 720, 730, and 740, respectively. The computing device 100 may determine the number of images (e.g., reference images) included in the clusters 720, 730, and 740, respectively. In the example of FIG. 7, the number of reference images included in a first cluster 720 is 4, the number of reference images included in a second cluster 730 is 18, and the number of reference images included in a third cluster 740 is 28. As an example, the computing device 100 compares a ratio of the number of images of each of the clusters to all images or all reference images, and a predetermined threshold ratio to distinguish the plurality of clusters into the front or the non-front. As another example, the computing device 100 compares the number of images of each of the clusters and a predetermined threshold number to distinguish the plurality of clusters into the front or the non-front. In the example of FIG. 7, since the first cluster 720 includes reference images less than the threshold ratio or the threshold number, the first cluster 720 may be determined as the non-front cluster. Since the second cluster 730 and the third cluster 740 include reference images equal to or more than the threshold ratio or the threshold number, the second cluster 730 and the third cluster 740 may be determined as the front clusters. Accordingly, the computing device 100 applies labeling corresponding to the non-front to the images included in the first cluster 720, and applies labeling corresponding to the front to the images included in the second cluster 730 and the third cluster 740 to construct a training dataset. The model for judging the distraction may be trained by using the training dataset.

As described above, the computing device 100 may collect gaze angles (e.g., a yaw value and a pitch value) collected under a condition in which the driving speed is equal to or higher than a predetermined speed during driving of the vehicle. The computing device 100 may construct the training dataset of the model by a scheme of determining a ground truth though clustering for each of the collected gaze angles, and allocating the ground truth to the collected gaze angle. The ground truth herein may be granted for each cluster group, and when the number of images in the corresponding group among all images is equal to or more than a reference ratio, a ground truth corresponding to the front may be allocated to the image, and when the number of images in the corresponding group among all images is not equal to or more than the reference ratio, a ground truth corresponding to the non-front may be allocated to the image. The model for judging the distraction or front carelessness by using the training dataset may be trained to output a result of the gaze class and a distance for the corresponding class as a new gaze angle (e.g., a yaw value and a pitch value) is input, by using a training dataset including the collected image and the ground truth corresponding to the image.

FIGS. 8A, 8B, and 8C exemplarily illustrate a training and inference method of the model according to an exemplary embodiment of the present disclosure.

In an exemplary embodiment, FIG. 8A exemplarily illustrates a training process of a model. A clustering model 820*a* may be used, which groups a plurality of data into a plurality of groups. A reference image 810*a* may indicate a group of image of a number satisfying a threshold number condition. The clustering model 820*a* clusters the reference image 810*a* to generate a grouping result 830*a* including a plurality of groups or a plurality of clusters. The clustering model 820*a* may correspond to an artificial intelligence-based model pre-trained to cluster input data by a scheme of including similar data in one cluster based on a gaze angle value, for example. As a non-limited example, the clustering model 820*a* may also operate by using a rule-based algorithm that groups or distinguishes data based on a value of data. Clustering of the reference image 810*a* may include grouping the reference images 810*a* into a plurality of gaze clusters based on a gaze angle (e.g., a combination of a yaw value and a pitch value) of the driver in the reference images 810*a*. The grouping result 830*a* may correspond to contents exemplarily illustrated in FIG. 7.

In an exemplary embodiment, based on quantitative values of images included in the plurality of groups or the plurality of clusters, respectively, a ground truth (front or non-front) for each of the clusters in the grouping result 830*a* may be determined. A training dataset 840*a* may be constructed, which includes the images in the clusters and the ground truth of the cluster.

The training dataset 840*a* may be generated by determining at least one cluster corresponding to a major gaze angle (e.g., a major gaze angle range) among the plurality of clusters as the front class, and determining at least one cluster corresponding to an angle other than the major gaze angle as the non-front class. As an example, majority may be used to express a ratio or a number which is more than a specific threshold. As another example, the majority may be used to express a cluster having most images among the clusters. As another example, the majority may be used to express clusters with a predetermined ranking based on the number of images among the clusters.

The training dataset 840*a* may be generated by labeling, based on quantitative information of the images included in the plurality of clusters generated by the clustering of the reference images 810*a*, each of the plurality of gaze clusters with the first gaze class or the second gaze class. For example, the training dataset may be generated by a scheme in which at least one cluster including reference images equal to or high than a predetermined threshold ratio based on the total number of reference images 810*a* among the plurality of clusters is labeled with the first gaze class, and at least one gaze cluster including reference images less than the predetermined threshold ratio based on the total number of reference images 810*a* among the plurality of clusters is labeled with the second gaze class. For the example, two gaze classes (front or non-front) are disclosed, but an exemplary embodiment in which at least one gaze cluster is labeled with three or more gaze classes may also be included in the scope of the present disclosure according to an implementation aspect.

In an exemplary embodiment, training the first model 850*a* for determining the distraction may be made by using the training dataset 840*a*. The first model 850*a* may be trained to output a result 860*a* by inputting the training dataset 840*a*. For example, the result 860*a* may include a result indicating whether the input data has the front class or the non-front class. For example, the result 860*a* may include a result indicating whether the distraction is present. For example, the result 860*a* may include a distraction score indicating a distraction likelihood. For example, the result 860*a* may include values indicating a gaze angle extracted from input data, and a distance of each of the plurality of clusters. For example, the result 860*a* may include values indicating the gaze angle extracted from the input data, and a distance between clusters which belong to the corresponding gaze angle.

In an exemplary embodiment, the first model 850*a* may be updated according to a predetermined period or condition. For example, when a reference image 810*a* which satisfies a condition of a predetermined driving speed or higher is input into the computing device 100, the reference image 810*a* may be added within a predetermined size of a queue. When data which exceeds the size of the queue is input, data in the queue may be updated by a scheme of deleting the oldest data in the queue. When the data which exceeds the size of the queue is input, the data in the queue may be updated by a scheme of deleting specific data which is probabilistically determined in the queue. As an example, the training dataset 840*a* may be updated based on the update scheme of the data, and as a result, the first model 850*a* may be additionally trained.

In an exemplary embodiment, the first model 850*a* may be trained by the unit of a predetermined period. As the first model 850*a* is trained, a weight of the first model 850*a* is updated.

In an exemplary embodiment, FIG. 8B exemplarily illustrates an inference process of a pre-trained model.

In an exemplary embodiment, the first model 850*a* may correspond to a classification model pre-trained to output, as the result 860*a*, when a new yaw value and a new pitch value are input, a classification result of the corresponding values and a distance to the corresponding classification result.

As a non-limited example, a first model 820*b* of FIG. 8B may correspond to the first model 850*a* trained in FIG. 8A.

As a non-limited example, an image 810*b* of FIG. 8B may be an image different from the reference image 810*a* of FIG. 8A. In such an example, the image 810*b* may correspond to an image collected regardless of the condition in which the driving speed is equal to or higher than the reference driving speed.

In an exemplary embodiment, the first model 820*b* may determine the gaze angle of the face from the image 810*b*. The first model 820*b* may determine the gaze angle of the face by extracting the yaw value and the pitch value from the image 810*b*. The gaze angle of the face may be included in a result 830*b*.

In an exemplary embodiment, the first model 820*b* may determine a distance between the extracted yaw value and pitch value, and the grouping result 830*a* in the training process. For example, the first model 820*b* may determine a distance between the plurality of clusters included in the grouping result 830*a*, and a face angle determined from the extracted yaw value and pitch value. The distance may be included in the result 830*b*.

In an exemplary embodiment, the first model 820*b* may determine a cluster corresponding to the image 810*b* among the plurality of clusters included in the grouping result 830*a* of the reference images 810*a*. The cluster corresponding to the image 810*b* may be included in the result 830*b*. In an exemplary embodiment, the first model 820*b* may determine a gaze class to which the cluster corresponding to the image 810*b* belongs among the plurality of gaze classes as the gaze class corresponding to the image 810*b*. The gaze class may be included in the result 830*b*.

In an exemplary embodiment, the first model 820*b* may output a result 830*b* indicating whether the distraction of the driver is present in the image 810*b*. In an exemplary embodiment, the first model 820*b* may extract the yaw value and the pitch value from the image 810*b*, and determine whether the distraction of the driver is present in the image 810*b* by using a distance between the cluster corresponding to the image 810*b* among the plurality of trained clusters, and the extracted yaw value and pitch value. As a distance between at least one cluster which belongs to the gaze class corresponding to the front, and the yaw value and pitch value extracted from the image 810*b* is larger, or as a distance between at least one cluster which belongs to the second gaze class corresponding to the non-front, and the yaw value and pitch value extracted from the image 810*b* is smaller, the first model 820*b* may set the distraction score indicating the distraction likelihood of the driver higher. The distraction score may also be included in the result 830*b*.

FIG. 8C illustrates an example used in the inference process by a second model 820*c* for separate face recognition. A first model 830*d* and the first model 820*b* may correspond to each other, and the first models 830*d* and 820*b* may correspond to the first model 850*a* of which training is completed. An image 810*c* of FIG. 8C and the image 810*b* of FIG. 8B may correspond to each other.

In an exemplary embodiment, a yaw value and a pitch value 830*c* corresponding to the face of the driver in the image 810*c* may be generated by the second model 820*c* different from the first model 830*d*. The second model 820*c* may correspond to an artificial intelligence-based model pre-trained to output a face angle corresponding to the input image 810*c*. The second model 820*c* may correspond to an artificial intelligence-based model pre-trained to output the yaw value and pitch value 830*c* corresponding to the input image 810*c*. The second model 820*c* may correspond to an artificial intelligence-based model pre-trained to output, from the image 810*c*, the yaw value and pitch value 830*c* corresponding to the face of the driver in the image 810*c*.

In an exemplary embodiment, the first model 830*d* may generate a result 830*e* by inputting the yaw value and pitch value 830*c* generated by the second model 810*c*. The result 830*e* herein may correspond to the result 830*b* in FIG. 8B described above.

Figure 9:
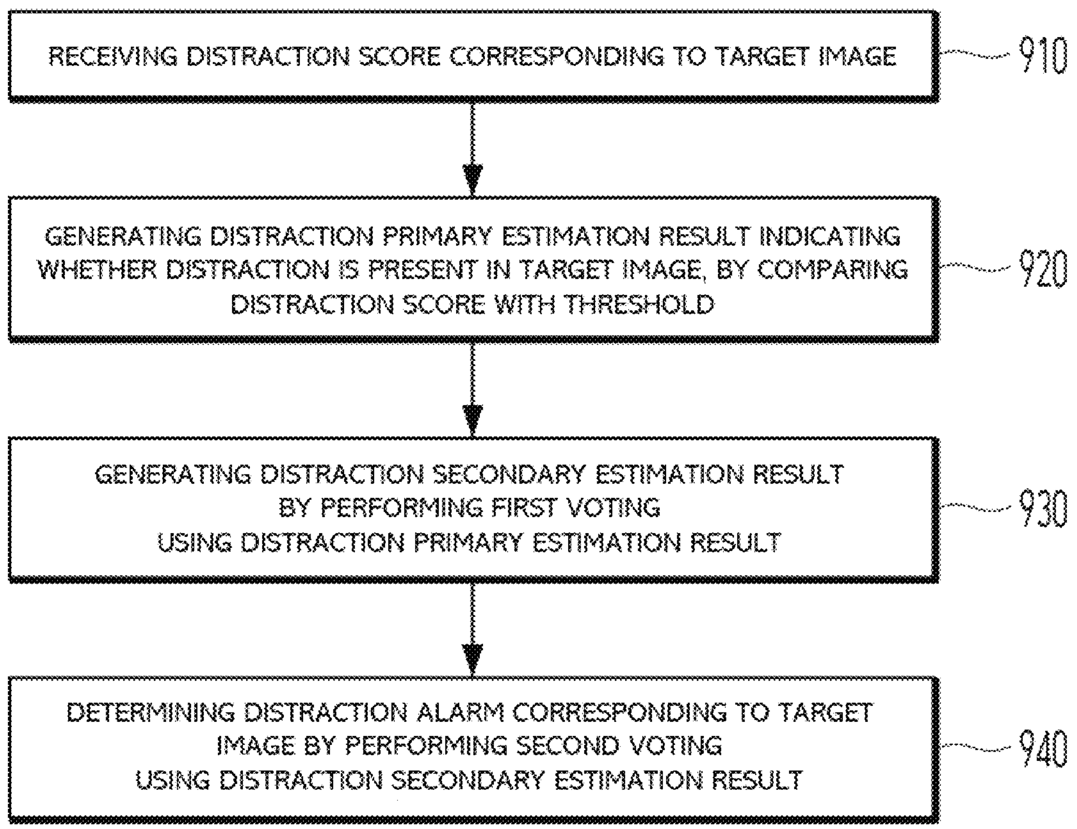
FIG. 9 exemplarily illustrates a method for determining a distraction alarm of a driver according to an exemplary embodiment of the present disclosure.

FIG. 9 exemplarily illustrates a method for determining a distraction alarm of a driver according to an exemplary embodiment of the present disclosure.

Contents duplicated with the above-described descriptions in the description in FIG. 9 will be omitted in order to avoid the duplication with the description.

As an example, the schemes related to the first voting and the second voting in FIG. 4 may correspond to the schemes related to the first voting and the second voting in FIG. 9. As an example, the model output information in FIG. 4 may correspond to a distraction score in FIG. 9. As an example, the thresholds in FIG. 4 may correspond to thresholds in FIG. 9. As an example, the anomaly primary estimation result and the anomaly secondary estimation result in FIG. 4 may correspond to a distraction primary estimation result and a distraction secondary estimation result in FIG. 9, respectively.

The technique according to an exemplary embodiment of the present disclosure may determine the gaze, the front carelessness, and/or the distraction of the driver from the image of the driver, and determine an alarm according to the determined result. The determining of the alarm is used to encompass determining whether the alarm is generated, and the type of alarm and/or the intensity of the alarm. The accuracy and reliability of the alarm provided to the driver by the DMS may be secured through the technique according to an exemplary embodiment of the present disclosure.

The technique according to an exemplary embodiment of the present disclosure may use one or more thresholds, one or more counters, and/or one or more votings in the process of determining the gaze, the front carelessness, and/or the distraction of the driver from the image of the driver. It may be possible that the DMS more accurately judges whether the distraction of the driver is present through the technique according to an exemplary embodiment of the present disclosure.

In an exemplary embodiment, the computing device 100 may receive a distraction score corresponding to a target image (910).

In an exemplary embodiment, the distraction score may include a result value quantitatively indicating a likelihood that the distraction of the driver will be present in the image. In an exemplary embodiment, the distraction score may include a result value quantitatively indicating a likelihood that the drivers will be gazing at the non-front in the image. In an exemplary embodiment, the distraction score may include a result value quantitatively indicating a likelihood that the gaze of the driver will not face the front or forward in the image. In an exemplary embodiment, the distraction score may include a result value quantitatively indicating a likelihood that the driver will not concentrate on driving in the image. The distraction score may be generated based on the output of the artificial intelligence-based classification model.

In an exemplary embodiment, the target image indicates a target for judging whether the distraction is present. In an exemplary embodiment, the target image indicates a target for determining the distraction alarm.

In an exemplary embodiment, the computing device 100 may generate or receive a distraction primary estimation result indicating whether the distraction is present in the target image by comparing the distraction score and a threshold (920).

For example, the threshold is a threshold which becomes a reference for judging whether the distraction is present. For example, the threshold is a threshold which becomes a reference for determining the distraction primary estimation result.

In an exemplary embodiment, the threshold may be determined based on at least one previous result corresponding to at least one previous image received prior to the target image. The threshold may be varied based on at least one previous result corresponding to at least one previous image received prior to the target image. The threshold may be varied based on a previous threshold of an immediately previous image received immediately prior to the target image based on at least one previous result corresponding to at least one previous image received prior to the target image. An expression "the threshold is variable" may be used to encompass the threshold having a value which is the same as the previous threshold, or a value different from the previous threshold.

In an exemplary embodiment, the previous result may indicate a judgment result or an estimation result of the distraction of the driver for the image received prior to the target image. For example, when a ratio of a result value indicating that the distraction is present among previous results corresponding to previous images received prior to the target image (e.g., sequentially received previous images) is equal to or more than a first ratio, the threshold may be set to a first value, and when the ratio of the result value indicating the presence of the distraction among the previous results corresponding to the previous images received prior to the target image is less than the first ratio, the threshold may be set to a second value higher than the first value. For example, In such an example, in such a situation in which the first image, the second image, and the third image are received prior to the target image, it is assumed that a result (1) indicating that the distraction is present is derived from the first image, a result (0) indicating that the distraction is not present is derived from the second image, and the result (1) indicating that the distraction is present is derived from the third image. Under the assumption, a threshold for judging the distraction of the target image may be set to have a value lower than a threshold for determining a result of the first image (e.g., an image receive immediately prior to the target image) according to a result (e.g., a ratio of 66.6%) indicating that the distraction is present among previous results of the first image, the second image, and the third image. In such an example, in a state in which the previous threshold has the lower value, the threshold corresponding to the target image may also be set to have the value which is the same as the previous threshold. In an additional example, the threshold may also be determined variably by considering both the previous result and the result corresponding to the target image.

In an exemplary embodiment, a distraction primary estimation result may correspond to an anomaly primary estimation result in FIG. 4. The distraction primary estimation result may be determined based on comparison between the distraction score received from the model or the distraction score received by the rule based algorithm, and a threshold. When the distraction score is more than the threshold, it is determined that the distraction is present within the target image. When the distraction is present within the target image, the distraction primary estimation result may have a value of 1. When the distraction score is not more than the threshold, it is determined that the distraction is not present within the target image. When the distraction is not present within the target image, the distraction primary estimation result may have a value of 0.

In an exemplary embodiment, the computing device 100 performs a first voting by using the distraction primary estimation result to generate or receive a distraction secondary estimation result (930).

In an exemplary embodiment, the computing device 100 performs the first voting by using the distraction primary estimation result to determine a distraction alarm corresponding to an input target image.

In an exemplary embodiment, the computing device 100 may generate the distraction secondary estimation result corresponding to the target image by using the distraction primary estimation results of the target image and the previous image(s). As an example, the distraction secondary estimation result may indicate whether the distraction state of the driver is present in the image. As an example, the distraction secondary estimation result may indicate whether a distraction alarm corresponding to the image is generated. As an example, the distraction secondary estimation result may be used as a factor for determining the type of distraction alarm corresponding to the image. As an example, the distraction secondary estimation result may be used as a factor for determining the intensity of the distraction alarm corresponding to the target image. The distraction secondary estimation result may be used as a factor for determining the generation of the distraction alarm corresponding to the image.

In an exemplary embodiment, the first voting may determine which result between the distraction primary estimation result of the target image which becomes a target of distraction judgment and the distraction primary estimation results of the previous images the majority value is, and generate the distraction secondary estimation result corresponding to the target image by using the determined majority value.

In an exemplary embodiment, the first voting may generate a group distraction estimation result representing an image group constituted by the target image, and a first number of sequential images predetermined, which are received prior to the target image. In an exemplary embodiment, the first voting may be used to generate the distraction secondary estimation result indicating whether the distraction is present in the target image by using the group distraction estimation result. The group distraction estimation result herein may include a result value representing the group between a result value indicting the presence of the distraction and a result value of non-presence of the distraction. The group distraction estimation result may indicate one estimation result representing a plurality of distraction primary estimation results. For example, when a proportion of an image having a result indicating the distraction among a plurality of images is high, it may be determined that the estimation result representing the corresponding group (e.g., a estimation result of each of images included in the corresponding group) is the distraction state.

In an additional exemplary embodiment, a value of the distraction score may also be additionally reflected to the result value representing the group. In such an exemplary embodiment, the distraction score may be used as a weight or a factor for determining the result value representing the group.

In an exemplary embodiment, it is assumed that distraction primary estimation results are present which correspond to five sequential images including the target image, and the images have values of 0, 0, 1, 1, and 0, respectively. Under such an assumption, 0 may indicate the non-presence of the distraction, and 1 may indicate the presence of the distraction. The distraction secondary estimation result may be determined which corresponds to the target image by combining the plurality of distraction primary estimation results. Under the assumption, a group distraction estimation result representing five distraction primary estimation results may have the value of 0. As a result, a first distraction secondary estimation result corresponding to the target image may have the value of 0.

In an exemplary embodiment, the distraction secondary estimation result may be expressed as a value of a counter. The value of the counter may be determined by using the result of the first voting. According to the result of the first voting, it may be determined whether the value of the counter is to be added, is decreased, or maintained. It may be determined whether the value of the counter is to be added, is decreased, or maintained based on the first voting, and a threshold range of the counter value. The threshold range of the counter value may define a maximum value at which the counter value is not increased any longer, but maintained or decreased, and define a minimum value at which the counter value is not decreased any longer, but maintained or increased. The computing device 100 may generate one or more current counter values corresponding to the current image by a scheme of maintaining, increasing, or decreasing one or more previous counter values corresponding to an image received prior to the target image based on the result of the first voting, and obtain a distraction secondary estimation result including one or more current counter values.

In an exemplary embodiment, a unit of the increase or decrease of the counter may be set in various types. For example, a predetermined fixation value may be used as the unit of the increase or decrease. For example, the unit of the increase or decrease of the counter may be determined based on a difference value between receiving times of the previous image and the current image. In such an example, when the difference between the receiving time of the previous image and the receiving time of the current image is 15 ms, and when the distraction primary estimation result includes the presence of the distraction, a counter value of a target image may be increased compared to the counter value of the previous image by a value of 15 or 0.15.

In an exemplary embodiment, the computing device 100 performs a second voting by using the distraction secondary estimation result to determine the distraction alarm corresponding to the target image (940).

In an exemplary embodiment, the computing device 100 performs the second voting by using the distraction secondary estimation result to determine whether to generate the distraction alarm corresponding to the target image or whether the distraction of the driver is present in the target image. In an exemplary embodiment, the computing device 100 performs the second voting by using the distraction secondary estimation result to determine the intensity or the type of distraction alarm corresponding to the target image.

In an exemplary embodiment, the second voting may determine whether there is continuity in the distraction secondary estimation results in the image group constituted by the target image which becomes a target of distraction judgment and a second number of sequential images predetermined, which are received prior to the target image. The second voting may use a combination of the distraction secondary estimation results. The second voting may determine whether to generate an alarm corresponding to the target image or whether the distraction of the user is present in the target image based on whether there is the continuity in the distraction secondary estimation results.

In an exemplary embodiment, the second voting may include comparing the counter value and a counter threshold. The second voting may be used to determine on or off of one or more distraction alarms corresponding to the image by comparing one or more current counter values and one or more predetermined counter thresholds. For example, when the current counter value reaches a specific threshold, the distraction alarm is set to ON, and when the current counter value is less than the specific threshold, the distraction alarm may be set to OFF. Based on comparison between a plurality of respective counter values and a plurality of respective thresholds, when a specific counter value exceeds a specific threshold, the type or the intensity of distraction alarm may be determined according to a combination of the specific counter value and the specific threshold. In an exemplary embodiment, a level at which the counter value exceeds an alarm threshold and the intensity of the alarm may have a correlation. According to the level at which the counter value exceeds the alarm threshold, the intensity of the alarm may be determined differently. An excess value by which the counter value exceeds the alarm threshold and the intensity of the alarm may have a positive correlation. In such an exemplary embodiment, as the level at which the counter value exceeds the alarm threshold increases, the intensity of the alarm may also increase. The intensity of the alarm herein may indicate the size of an alarm image, an alarm sound, alarm light, and/or alarm vibration.

In an exemplary embodiment, the second voting may adopt a plurality of alarm thresholds. As an example, the plurality of alarm thresholds may have different alarm intensities and/or alarm types. As another example, some of the plurality of alarm thresholds may have the same alarm intensity and/or alarm type. The second voting compares each of the plurality of alarm thresholds and a counter corresponding to a specific image to determine the type of alarm, the intensity of the alarm, and/or whether the alarm is generated. As an example, a first alarm when the counter exceeds one alarm threshold among the plurality of alarm thresholds may have a lower intensity than a second alarm when the counter exceeds two or more alarm thresholds. As an example, a first alarm when the counter exceeds one alarm threshold among the plurality of alarm thresholds and a second alarm when the counter exceeds two or more alarm thresholds may have different types of alarms. As an example, when the counter exceeds a plurality of alarm thresholds, an alarm having a high priority or intensity among alarms corresponding to the plurality of alarm thresholds, respectively may be selected. In this case, an alarm having a low priority or intensity is not generated even though the counter exceeds the alarm threshold.

In an exemplary embodiment, a plurality of counters may be allocated to the target image. The second voting compares each of the plurality of counters and the alarm threshold to determine whether the alarm is generated for each of the plurality of counters. The types or intensities of the alarm for the respective counters may be the same as each other or different from each other. As an example, a first alarm when one counter exceeds the alarm threshold may have a lower intensity than a second alarm when the plurality of counters exceeds the alarm threshold.

In an exemplary embodiment, the second voting compares the plurality of respective counters and the plurality of respective alarms to determine whether the alarm is generated, the type of alarm, and/or the intensity of the alarm.

As described above, the technique according to an exemplary embodiment of the present disclosure may use one or more votings, one or more counters, and one or more thresholds in order to generate the alarm corresponding to the distraction, and/or in order to determine whether the distraction of the driver is present. As a result, sensitivity, accuracy, and reliability of an alarm corresponding to a distraction situation may be all enhanced. As one or more votings are used, sensitivity, accuracy, and reliability of distraction judgment may be all enhanced.

Figure 10:
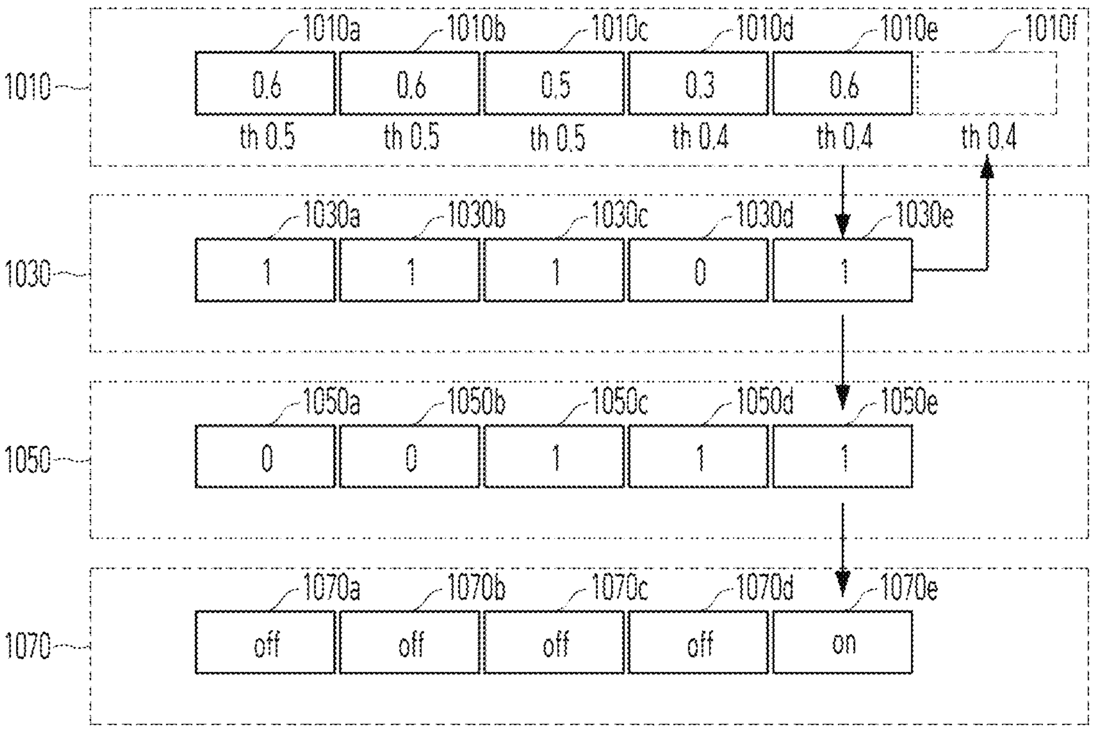
FIG. 10 exemplarily illustrates a method for determining an anomaly alarm of a driver according to an exemplary embodiment of the present disclosure.

FIG. 10 exemplarily illustrates a method for determining an anomaly alarm of the driver according to an exemplary embodiment of the present disclosure.

FIG. 10 exemplarily illustrates a methodology for generating an anomaly alarm according to an exemplary embodiment of the present disclosure.

The above-described examples among the examples illustrated in FIG. 10 will be replaced with the above-described contents in order to prevent duplication of the description.

As illustrated in FIG. 10, a voting technique according to an exemplary embodiment of the present disclosure may determine an anomaly alarm or determine whether to generate the anomaly alarm from an output or a result (e.g., a classification result, a distance value, and/or a distraction score) of a model by using a plurality of queues. In the present disclosure, the queue may be used interchangeably with a voting queue.

In an exemplary embodiment, the voting queue may include a first queue 1010, a second queue 1030, a third queue 1050, and a fourth queue 1070. The first queue 1010, second queue 1030, third queue 1050, and fourth queue 1070 may be used to determine the anomaly alarm according to an exemplary embodiment of the present disclosure. In FIG. 10, four queues are illustrated, but it will be apparent to those skilled in the art that various numbers of queues may be used according to various implementation aspects such as adding a new voting or deleting an existing voting.

In an exemplary embodiment, an X-axis direction (e.g., horizontal direction) of the first queue 1010, second queue 1030, third queue 1050, and fourth queue 1070 is a direction for expressing temporally received images. The first queue 1010, second queue 1030, third queue 1050, and fourth queue 1070 are configured to be close to a current time toward a right direction, and close to a past time toward a left direction. The first queue 1010, second queue 1030, third queue 1050, and fourth queue 1070 include a plurality of units. In FIG. 10, it is illustrated that the first queue 1010, second queue 1030, third queue 1050, and fourth queue 1070 include five units corresponding to each other. It will be apparent to those skilled in the art that one queue may include various numbers of units according to an implementation aspect.

In an exemplary embodiment, a plurality of units in the queue may correspond to the received images, respectively. In the first queue 1010, second queue 1030, third queue 1050, and fourth queue 1070, first units 1010*a*, 1030*a*, 1050*a*, and 1070*a* may include a result corresponding to a first image at a first time, second units 1010*b*, 1030*b*, 1050*b*, and 1070*b* may include a result corresponding to a second image at a second time, third units 1010*c*, 1030*c*, 1050*c*, and 1070*c* may include a result corresponding to a third image at a third time, fourth units 1010*d*, 1030*d*, 1050*d*, and 1070*d* may include a result corresponding to a fourth image at a fourth time, and fifth units 1010*e*, 1030*e*, 1050*e*, and 1070*e* may include a result corresponding to a fifth image at a fifth time. Here, the first time is a time prior to the second time, the second time is a time prior to the third time, the third time is a time prior to the fourth time, the fifth time is a time prior to the fourth time.

In an exemplary embodiment, corresponding units in the first queue 1010, second queue 1030, third queue 1050, and fourth queue 1070 may include a judgment result for the same image received at the same time. For example, the first image received at the first time may be processed in the order of the first unit 1010*a* of the first queue 1010, the first unit 1030*a* of the second queue 1030, the first unit 1050*a* of the third queue 1050, and the first unit 1070*a* of the fourth queue 1070. According to a result of the processing, the fourth queue 1070 corresponding to a last queue may include a result of ON or OFF of the anomaly alarm corresponding to each image.

In an exemplary embodiment, the first queue 1010 may include the first unit 1010*a*, a second unit 1010*b*, a third unit 1010*c*, a fourth unit 1010*d*, and a fifth unit 1010*e*. For example, the fifth unit 1010*e* may include a judgment result corresponding to a current (or latest) input image. In an exemplary embodiment, the first queue 1010 is a queue representing the output of the model or a queue representing a result of postprocessing the output of the model. For example, the first queue 1010 may include model output information of each of a plurality of images. For example, the first queue 1010 is a queue that represents a detection result or a classification result of the model. The first unit 1010*a* may include first model output information corresponding to the first image at the first time, the second unit 1010*b* may include second model output information corresponding to the second image at the second time, the third unit 1010*c* may include third model output information corresponding to the third image at the third time, the fourth unit 1010*d* may include fourth model output information corresponding to the fourth image at the fourth time, and the fifth unit 1010*e* may include fifth model output information corresponding to the fifth image at the fifth time. Here, the first time may be a most past time, and subsequent times may be expressed from the first time toward the fifth time. Further, sixth model output information corresponding to a sixth image received at a sixth time which is a future time will be allocated to a sixth unit 1010*f*. In an exemplary embodiment, the first queue 1010 may be set to include a predetermined number of units by a scheme of removing a most past unit as a new unit is input. For example, when the sixth model output information is allocated to the sixth unit 1010*f*, the first unit 1010*a* will be removed from the queue.

In an exemplary embodiment, the second queue 1030 may include the first unit 1030*a*, a second unit 1030*b*, a third unit 1030*c*, a fourth unit 1030*d*, and a fifth unit 1030*e*. Values included in the units 1030*a*, 1030*b*, 1030*c*, 1030*d*, and 1030*e* of the second queue 1030, respectively may be determined based on comparison between information included in a unit corresponding to the first queue 1010 and a threshold allocated to the unit corresponding to the first queue 1010. The values included in the units 1030*a*, 1030*b*, 1030*c*, 1030*d*, and 1030*e* of the second queue 1030, respectively may include an anomaly primary estimation result.

In an exemplary embodiment, the second queue 1030 may include an anomaly primary estimation result determined based on comparison between the model output information and the threshold. The first unit 1030*a* may include a first anomaly primary estimation result corresponding to the first image at the first time, the second unit 1030*b* may include a second anomaly primary estimation result corresponding to the second image at the second time, the third unit 1030*c* may include a third anomaly primary estimation result corresponding to the third image at the third time, the fourth unit 1030*d* may include a fourth anomaly primary estimation result corresponding to the fourth image at the fourth time, and the fifth unit 1030*e* may include a fifth anomaly primary estimation result corresponding to the fifth image at the fifth time.

An expression "the threshold is variable" may be used to encompass both an exemplary embodiment in which the threshold is set to one value among a plurality of (e.g., two) threshold options and an exemplary embodiment in which the threshold is increased, decreased, or maintained to be the same based on a previous threshold.

In an exemplary embodiment, a threshold allocated to a current unit of the first queue 1010 may be variable based on a value included in a previous unit in another queue. For example, the threshold allocated to the current unit of the first queue 1010 may be determined based on a first anomaly primary estimation result of a previous unit of the first queue 1010. For example, in FIG. 10, when the model output information exceeds the threshold, the anomaly primary estimation result may have the value of 1, and when the model output information does not exceed the threshold, the anomaly primary estimation result may have the value of 0. The first anomaly primary estimation result may be determined by comparison between first model output information of 0.6 and a threshold of 0.5, and may have the value of 1. The second anomaly primary estimation result may be determined by comparison between second model output information of 0.6 and the threshold of 0.5, and may have the value of 1. The third anomaly primary estimation result may be determined by comparison between third model output information of 0.6 and the threshold of 0.5, and may have the value of 1. The fourth anomaly primary estimation result may be determined by comparison between fourth model output information of 0.3 and a threshold of 0.4, and may have the value of 0. The fifth anomaly primary estimation result may be determined by comparison between fifth model output information of 0.6 and a threshold of 0.4, and may have the value of 1. As illustrated in FIG. 10, a value of a specific unit of the first queue 1010 is equal to or larger than a threshold allocated to the specific unit of the first queue 1010, a value included in the specific unit of the second queue 1030 is determined as 1. A value of a specific unit of the first queue 1010 is smaller than the threshold allocated to the specific unit of the first queue 1010, the value included in the specific unit of the second queue 1030 is determined as 0. For example, a threshold allocated to a current unit (e.g., an N-th unit) of the first queue 1010 may be variable according to a value included in an immediately previous unit (e.g., an N-1-th unit) of a current unit of the second queue 1030. In such an example, when the value of the second unit 1030*b* of the second queue 1030 is set to 1, a threshold allocated to the third unit 1010*c* of the first queue 1010 is subtracted from 0.5 which is the threshold of the second unit 1010*b* which is the previous unit by 0.1 to be determined as 0.4. In another exemplary embodiment, when the value of the second unit 1030*b* of the second queue 1030 is set to 0, a threshold allocated to the third unit 1010*c* of the first queue 1010 is maintained to be the same as 0.5 which is the threshold of the second unit 1010*b* which is the previous unit or added with 0.1 to be determined as 0.6. N in this specification may mean a natural number.

In an exemplary embodiment, the threshold corresponding to each of the units of the first queue 1010 may be set to one of a first value and a second value. In the exemplary embodiment, the threshold corresponding to the current unit of the first queue 1010 may be set to one of the first value and the second value by using a result value(s) corresponding to a previous unit(s). In the exemplary embodiment, when the result value(s) corresponding to the previous unit(s) indicates the presence of the anomaly, the threshold corresponding to the current unit of the first queue 1010 may be set to a smaller value between the first value and the second value. In the exemplary embodiment, when the result value(s) corresponding to the previous unit(s) indicates the non-presence of the anomaly, the threshold corresponding to the current unit of the first queue 1010 may be set to a larger value between the first value and the second value.

In an exemplary embodiment, a current threshold corresponding to the current unit may be maintained or changed based on a previous threshold corresponding to the previous unit(s). In an example in which the threshold is changed, for example, when it is determined that an anomaly estimation result corresponding to the previous unit(s) indicates the presence of the anomaly, the current threshold may be set to have a descending tendency. Here, the descending tendency may include maintaining the current threshold to be the same as the previous threshold or setting the current threshold to be lower than the previous threshold. The case where the current threshold is set to be lower may mean that a possibility that the current image will be judged to be an anomaly increases. In the example in which the threshold is changed, for example, when it is determined that the anomaly estimation result corresponding to the previous unit(s) indicates the non-presence of the anomaly, the current threshold may be set to have an ascending tendency. Here, the ascending tendency may include maintaining the current threshold to be the same as the previous threshold or setting the current threshold to be higher than the previous threshold. The case where the current threshold is set to be higher may mean that the possibility that the current image will be judged to be anomaly decreases. As described above, the technique according to an exemplary embodiment of the present disclosure determines the anomaly estimation result of the current image to have a similar (corresponding) tendency to the anomaly estimation result of the previous image to enhance the accuracy of the anomaly judgment.

In an exemplary embodiment, the threshold allocated to the current unit of the first queue 1010 may be determined based on values included in a plurality of previous units of the second queue 1030. In an exemplary embodiment, the threshold allocated to the specific unit of the first queue 1010 may be variable according to values of previous units of other queue(s) other than the first queue 1010. For example, based on comparison between a ratio value or an average value received from the values of the previous units of the second queue 1030 or a specific threshold, the threshold allocated to the current unit of the first queue 1010 may be determined. The specific threshold herein as a threshold for determining the threshold allocated to the current unit may mean a threshold of a ratio format such as 30%, 40%, 50%, and 80%. For example, the threshold of the second unit 1010*b* of the first queue 1010 may be determined based on values of the first unit 1030*a* of the second queue 1030 and a previous unit(s) of the first unit 1030*a*. When it is determined that a ratio of the value of 1 among the values of the first unit 1030*a* and the previous unit(s) of the first unit 1030*a* (e.g., a ratio determined as the anomaly) of the second queue 1030 does not exceed the specific threshold, the threshold of the second unit 1010*b* of the first queue 1010 may be maintained to be 0.5. The threshold of the third unit

1010*c* of the first queue 1010 may be determined based on values of the first unit 1030*a* and the second unit 1030*b* of the second queue 1030. Alternatively, the threshold of the third unit 1010*c* of the first queue 1010 may be determined based on values of the first unit 1030*a*, the second unit 1030*b*, and the previous unit(s) of the first unit 1030*a* of the second queue 1030. For example, when it is determined that a ratio of the value of 1 among the values of the first unit 1030*a* and the previous unit(s) of the first unit 1030*a* (e.g., a ratio determined as the anomaly) of the second queue 1030 exceeds the specific threshold, the threshold of the third unit 1010*c* of the first queue 1010 may be set to 0.4. For example, when it is determined that a ratio of the value of 1 among the values of the first unit 1030*a* and the previous unit(s) of the first unit 1030*a* (e.g., a ratio determined as the anomaly) of the second queue 1030 does not exceed the specific threshold, the threshold of the third unit 1010*c* of the first queue 1010 may be set to 0.5. As another example, the threshold allocated to the fifth unit 1010*e* of the first queue 1010 may be determined based on comparison between a value indicating the anomaly among the values of the previous units 1030*a*, 1030*b*, 1030*c*, and 1030*d* of the second queue 1030 and a predetermined threshold. For example, when it is determined that a ratio of a result value (e.g., the value of 1) indicating that the anomaly is present among the values of the previous units 1030*a*, 1030*b*, 1030*c*, and 1030*d* of the second queue 1030 is equal to or more than 40%, the threshold allocated to the fifth unit 1010*e* of the first queue 1010 may be set to 0.4. For example, when it is determined that a ratio of the result value (e.g., the value of 1) indicating that the anomaly exists among the values of the previous units 1030*a*, 1030*b*, 1030*c*, and 1030*d* of the second queue 1030 is less than 40%, the threshold allocated to the fifth unit 1010*e* of the first queue 1010 may be set to 0.5.

In an exemplary embodiment, the threshold allocated to the current unit (e.g., the N-th unit) of the first queue 1010 may be variable according to values included in previous units (e.g., an N-1-th unit, an N-2-th unit, an N-3-th unit, and an N-4-th unit) of the current unit of the second queue 1030. In such an example, the threshold allocated to the fifth unit 1010*e* of the first queue 1010 may be determined based on a majority value or a representative value of the values of the previous units 1030*a*, 1030*b*, 1030*c*, and 1030*d* of the second queue 1030. The majority value or the representative value may be determined as a value having a highest proportion among values included in a predetermined number of units. For example, among the values of 1 or 0 included in five sequential units, the majority value and the representative value may be determined. In such an example, since four units have the value of 1 and one unit has the value of 0 among the units 1030*a*, 1030*b*, 1030*c*, and 1030*d* of the second queue 1030, a majority value or a representative value of five units of the second queue 1030 may be determined as 1. When the majority value or representative value of the values of the previous units 1030*a*, 1030*b*, 1030*c*, and 1030*d* of the second queue 1030 is 1, the threshold allocated to the fifth unit 1010*e* of the first queue 1010 may be set to 0.4. In such an example, when the majority value or representative value of the values of the previous units 1030*a*, 1030*b*, 1030*c*, and 1030*d* of the second queue 1030 is 0, the threshold allocated to the fifth unit 1010*e* of the first queue 1010 may be set to 0.5. As illustrated in FIG. 10, the threshold to be allocated to the sixth unit 1010*f* of the first queue 1010 may be determined based on the majority value, the representative value, or the ratio of the values of the previous units 1030*a*, 1030*b*, 1030*c*, 1030*d*, and 1030*e* of the second queue 1030.

In this specification, for convenience of description, the corresponding contents are omitted, but it will be apparent to those skilled in the art that as a new unit is added in the queue, the values of the previous unit of the first unit 1010*a* of the first queue 1010 may also be considered according to characteristics of a queue excluded from the most past unit.

In an exemplary embodiment, the threshold allocated to the current unit of the first queue 1010 may also be determined based on a value included in at least one previous unit of the third queue 1050. The threshold allocated to the fifth unit 1010*e* of the first queue 1010 may be determined based on a value of a previous unit (e.g., the fourth unit 1050*d*) of the third queue 1050. For example, when the value of the fourth unit 1050*d* of the third queue 1050 is 1, the threshold of the fifth unit 1010*e* of the first queue 1010 may be determined as 0.4. Alternatively, the threshold may be maintained to be the same as the previous threshold or the threshold may be decreased compared to the previous threshold. For example, when the value of the first unit 1050*a* of the third queue 1050 is 0, the threshold of the second unit 1010*b* of the first queue 1010 may be determined as 0.5. Alternatively, the threshold may be maintained to be the same as the previous threshold or the threshold may be increased compared to the previous threshold.

In an exemplary embodiment, referring to the example of FIG. 10, a threshold corresponding to a subsequent unit of the first queue 1010 may be determined according to a majority value (e.g., a value having three or more between 0 and 1) of values of five units of the second queue 1030. In the example of FIG. 10, a value of the first unit 1030*a* of the second queue 1030 may be determined as 1. It is assumed that four previous units of the first unit 1030*a* of the second queue 1030 have values of 0, 0, 0, and 0, respectively. Under the assumption, a majority value of values of the first unit 1030*a* of the second queue 1030, and four previous units may be determined as 0. As a result, a threshold corresponding to the second unit 1010*b* of the first queue 1010 may be determined as 0.5. Then, the second unit 1030*b* of the second queue 1030 may be determined to have the value of 1, and a majority value of values of the second unit 1030*b* of the second queue 1030, and four previous units may be determined as 0. As a result, a threshold corresponding to the third unit 1010*c* of the first queue 1010 may be determined as 0.5. Then, the third unit 1030*c* of the second queue 1030 may be determined to have the value of 1, and a majority value of values of the third unit 1030*c* of the second queue 1030, and four previous units may be determined as 1. As a result, a threshold corresponding to the fourth unit 1010*d* of the first queue 1010 may be determined as 0.4. Then, the fourth unit 1030*d* of the second queue 1030 may be determined to have the value of 0, and a majority value of values of the fourth unit 1030*d* of the second queue 1030, and four previous units may be determined as 1. As a result, a threshold corresponding to the fifth unit 1010*e* of the first queue 1010 may be determined as 0.4. Then, the fifth unit 1030*e* of the second queue 1030 may be determined to have the value of 1, and a majority value of values of the fifth unit 1030*e* of the second queue 1030, and four previous units (e.g., 1030*a*, 1030*b*, 1030*c*, and 1030*d*) may be determined as 1. As a result, a threshold corresponding to the sixth unit 1010*f* of the first queue 1010 may be determined as 0.4.

In an exemplary embodiment, the values of the units 1050*a*, 1050*b*, 1050*c*, 1050*d*, and 1050*e* of the third queue 1050 may be determined based on the result of the first voting using the values of the units 1030*a*, 1030*b*, 1030*c*, 1030*d*, and 1030*e* included in the second queue 1030. The value included in the unit of the third queue 1050 may be determined based on the majority value, the representative value, or the ratio of the anomaly primary estimation results. For example, the fifth unit 1050*e* of the third queue 1050 may be determined based on the representative value and the majority value of the values of the units 1030*a*, 1030*b*, 1030*c*, 1030*d*, and 1030*e* of the second queue 1030. In such an example, the fifth unit 1050*e* of the third queue 1050 may be set to 1 which is the majority value or representative value of the units 1030*a*, 1030*b*, 1030*c*, 1030*d*, and 1030*e* of the second queue 1030. The number of units for determining the majority value or the representative value may be set to various numbers such as three or four in addition to five. As another example, the fifth unit 1050*e* of the third queue 1050 may also be determined based on comparison between a ratio of units having the value of 1 among the values of the units 1030*a*, 1030*b*, 1030*c*, 1030*d*, and 1030*e* of the second queue 1030 and a threshold ratio.

In an exemplary embodiment, the fourth queue 1070 may correspond to a queue for generating the alarm. In an exemplary embodiment, values of the units 1070*a*, 1070*b*, 1070*c*, 1070*d*, and 1070*e* of the fourth queue 1070 may be determined based on a second voting using the values of the units of the third queue 1050. The fourth queue 1070 may determine whether the alarm is generated by considering the continuity of the values of the units of the third queue 1050 through the second voting. For example, a reference of the continuity of the values of the units is assumed as 3. Under the assumption, since all of the first unit 1050*a* of the third queue 1050 and two previous units do not have the value of 1, the first unit 1070*a* of the fourth queue 1070 may be set to 0 (e.g., alarm off). Since any of the second unit 1050*b* of the third queue 1050 and two previous units (1050*a* and the previous unit) does not have the value of 1, the second unit 1070*b* of the fourth queue 1070 may be set to 0 (e.g., alarm off). Since any of the third unit 1050*c* of the third queue 1050 and two previous units 1050*a* and 1050*b* does not have the value of 1, the third unit 1070*c* of the fourth queue 1070 may be set to 0 (e.g., alarm off). Since any of the fourth unit 1050*d* of the third queue 1050 and two previous units 1050*b* and 1050*c* does not have the value of 1, the fourth unit 1070*d* of the fourth queue 1070 may be set to 0 (e.g., alarm off). Since all of the fifth unit 1050*e* of the third queue 1050 and two previous units 1050*c* and 1050*d* have the value of 1, the fifth unit 1070*e* of the fourth queue 1070 may be set to 1 (e.g., alarm on).

As described above, the technique according to an exemplary embodiment of the present disclosure may use a plurality of queues in order to judge whether the anomaly is present or generate the alarm corresponding to the anomaly. A value included in a specific queue or a threshold allocated to the specific queue may be determined by using values included in another queue (e.g., previous queue) among the plurality of queues.

Figure 11:
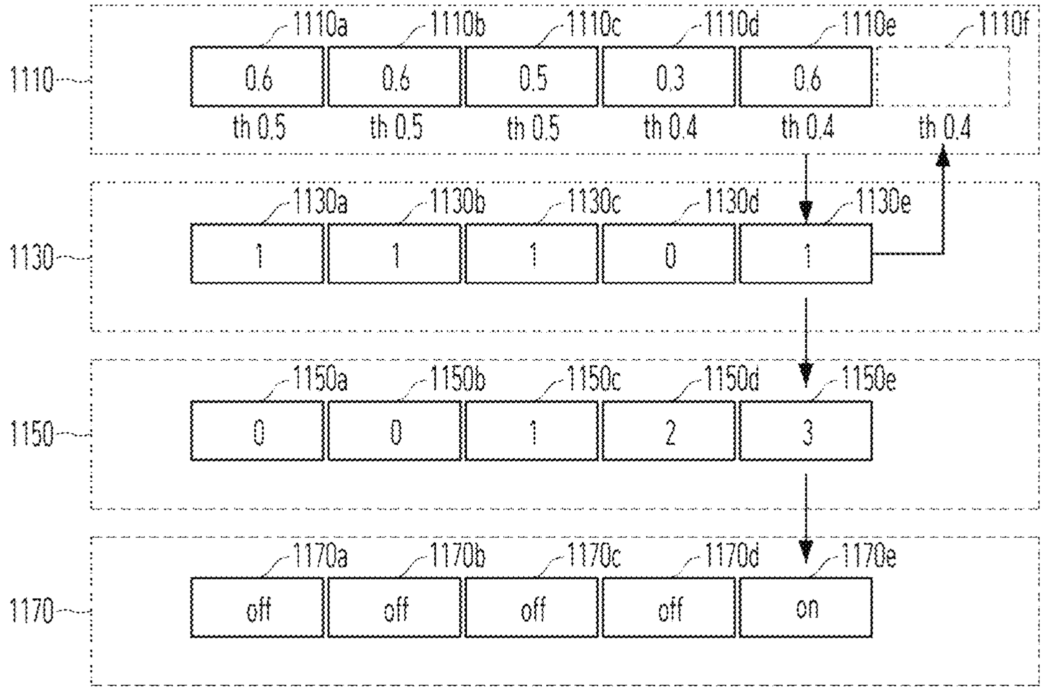
FIG. 11 exemplarily illustrates a method for determining an anomaly alarm of a driver according to an exemplary embodiment of the present disclosure.

FIG. 11 exemplarily illustrates a method for determining an anomaly alarm of the driver according to an exemplary embodiment of the present disclosure.

The above-described examples among the examples illustrated in FIG. 11 will be replaced with the above-described description in order to prevent duplication of the description.

A first queue 1110, and units 1110*a*, 1110*b*, 1110*c*, 1110*d*, 1110*e*, and 1110*f* included in the first queue in FIG. 11 may correspond to the first queue 1010, and the units 1010*a*, 1010*b*, 1010*c*, 1010*d*, 1010*e*, and 1010*f* included in the first queue in FIG. 10, respectively.

A second queue 1130, and units 1130*a*, 1130*b*, 1130*c*, 1130*d*, and 1130*e* included in the second queue in FIG. 11 may correspond to the second queue 1030, and the units 1030*a*, 1030*b*, 1030*c*, 1030*d*, and 1030*e* included in the second queue in FIG. 10, respectively.

A third queue 1150 in FIG. 11 may include a first unit 1150*a*, a second unit 1150*b*, a third unit 1150*c*, a fourth unit 1150*d*, and a fifth unit 1150*e*. In an exemplary embodiment, the values of the units 1150*a*, 1150*b*, 1150*c*, 1150*d*, and 1150*e* of the third queue 1150 may be determined based on the result of the first voting using the values of the units 1130*a*, 1130*b*, 1130*c*, 1130*d*, and 1130*e* included in the second queue 1130. The value included in the unit of the third queue 1150 may be determined based on the majority value, the representative value, or the ratio of the anomaly primary estimation results.

In an exemplary embodiment, FIG. 11 also illustrates an example in which a threshold of the first queue 1110 is determined based on a value of at least one previous unit of the second queue 1130. Referring to the example of FIG. 11, a threshold corresponding to a subsequent unit of the first queue 1110 may be determined according to a majority value (e.g., a value having three or more between 0 and 1) of values of five units of the second queue 1130. In the example of FIG. 11, a value of the first unit 1130*a* of the second queue 1130 may be determined as 1. It is assumed that four previous units of the first unit 1130*a* of the second queue 1130 have values of 0, 0, 0, and 0, respectively. Under the assumption, a majority value of values of the first unit 1130*a* of the second queue 1130, and four previous units may be determined as 0. As a result, a threshold corresponding to the second unit 1110*b* of the first queue 1110 may be determined as 0.5. Then, the second unit 1030*b* of the second queue 1130 may be determined to have the value of 1, and a majority value of values of the second unit 1130*b* of the second queue 1130, and four previous units may be determined as 0. As a result, a threshold corresponding to the third unit 1110*c* of the first queue 1110 may be determined as 0.5. Then, the third unit 1130*c* of the second queue 1130 may be determined to have the value of 1, and a majority value of values of the third unit 1130*c* of the second queue 1130, and four previous units may be determined as 1. As a result, a threshold corresponding to the fourth unit 1110*d* of the first queue 1110 may be determined as 0.4. Then, the fourth unit 1130*d* of the second queue 1130 may be determined to have the value of 0, and a majority value of values of the fourth unit 1130*d* of the second queue 1130, and four previous units may be determined as 1. As a result, a threshold corresponding to the fifth unit 1110*e* of the first queue 1110 may be determined as 0.4. Then, the fifth unit 1130*e* of the second queue 1130 may be determined to have the value of 1, and a majority value of values of the fifth unit 1130*e* of the second queue 1130, and four previous units (e.g., 1130*a*, 1130*b*, 1130*c*, and 1130*d*) may be determined as 1. As a result, a threshold corresponding to the sixth unit 1110*f* of the first queue 1110 may be determined as 0.4.

FIG. 11 exemplarily illustrates an exemplary embodiment in which the secondary anomaly estimation result is generated by a scheme of using the counter or the counter value as the first voting is performed. An example of FIG. 11 illustrates an exemplary embodiment in which the counter value is increased as the majority value or representative value becomes 1 according to the result of the first voting, and the counter value is maintained as the majority value or the representative value becomes 0 according to the result of the first voting. However, an exemplary embodiment in which the counter value is decreased as the majority value or representative value becomes 0 may also be included in the scope of the present disclosure according to an implementation aspect.

In an exemplary embodiment, as the first voting using the plurality of units including the first unit 1130*a* of the second queue 1130 is performed, the second unit 1150*b* of the third queue 1150 may have the value of 0. According to a result of performing the first voting using the plurality of units including the first unit 1130*a* and the second unit 1130*b* of the second queue 1130, the third unit 1150*c* of the third queue 1150 may have the value of 1 as the value of 1 which is the counter value is added. According to a result of performing the first voting using the plurality of units including the first unit 1130*a*, the second unit 1130*b*, and the third unit 1130*c* of the second queue 1130, the fourth unit 1150*d* of the third queue 1150 may have the value of 2 as the value of 1 which is the counter value is added. According to a result of performing the first voting using the plurality of units including the first unit 1130*a*, the second unit 1130*b*, the third unit 1130*c*, and the fourth unit 1130*d* of the second queue 1130, the fifth unit 1150*e* of the third queue 1150 may have the value of 3 as the value of 1 which is the counter value is added. When the anomaly secondary estimation result is generated as such, the counter value may not be added when the result of the first voting is 0 and the counter value may be added when the result of the first voting is 1.

In an exemplary embodiment, the fourth queue 1170 may correspond to a queue for generating the alarm. In an exemplary embodiment, values of the units 1170*a*, 1170*b*, 1170*c*, 1170*d*, and 1170*e* of the fourth queue 1170 may be determined based on a second voting using the values of the units of the third queue 1150.

In an exemplary embodiment, the second voting may include comparing values (e.g., counter values) of the respective units of the third queue 1150 and one or more thresholds. For example, when the values of the units of the third queue 1150 are equal to or more than the threshold, the second voting may determine to generate the alarm (ON) for the unit corresponding to the fourth queue 1170. For example, when the values of the units of the third queue 1150 are less than the threshold, the second voting may determine not to generate the alarm (OFF) for the unit corresponding to the fourth queue 1170. In the example of FIG. 11, since the threshold is set to 3, the computing device 100 may determine to generate the anomaly alarm for the fifth unit 1170*e* of the fourth queue 1170 corresponding to the fifth unit 1150*e* of the third queue 1150 having the value of 3.

In an exemplary embodiment, the counter value may have a predetermined range. When the counter value reaches a boundary value of the predetermined range, the computing device 100 may maintain or change the counter value by a different scheme from a case where the counter value does not reach the boundary value. For example, a situation is assumed in which the counter value may have a range of 0 to 5, and the threshold is 3. Under the assumption, the threshold of 3 may be compared with each of the units of the third queue 1150. When the first unit of the third queue 1150 has the value of 3, the computing device 100 may set a corresponding first unit of the fourth queue 1170 to be ON. When the second unit which is a subsequent unit of the third queue 1150 has the value of 4, the computing device 100 may set a corresponding unit of the fourth queue 1170 to be ON. When the third unit which is the subsequent unit of the third queue 1150 has the value of 5, the computing device 100 may set a corresponding third unit of the fourth queue 1170 to be ON. In such a situation, when it is determined that the value of 1 is added to the fourth unit which is the subsequent unit of the third queue 1150 through the first voting, the computing device 100 may set the fourth unit of the third queue 1150 to 5 (e.g., 1 is not added). As another example, when the value of 0 is determined as the majority value or representative value through the first voting with respect to the fourth unit which is the subsequent unit of the third queue 1150 in the same situation, the computing device 100 may set the fourth unit of the third queue 1150 to 4 (e.g., 1 is subtracted). As described above, in the state in which the anomaly secondary estimation result reaches the threshold range, the counter value is not increased any longer, and the counter value may be decreased or the counter value may be maintained. In such a situation, when the counter value is changed from 3 to 2 as the counter value is decreased, the computing device 100 may determine to turn off the anomaly alarm. As described above, the technique according to an exemplary embodiment of the present disclosure may set the threshold range of the counter value, and maintain or increase the counter value when the counter value reaches a minimum value in the threshold range. The technique according to an exemplary embodiment of the present disclosure may set the threshold range of the counter value, and maintain or decrease the counter value when the counter value reaches a maximum value in the threshold range. The technique according to an exemplary embodiment of the present disclosure may set the threshold range of the counter value, and replace the counter value with the minimum value or the maximum value when the counter value deviates from the minimum value or the maximum value in the threshold range.

In an exemplary embodiment, the type of alarm or the intensity of the alarm may be set differently according to a difference between the counter value and the threshold. When the counter value is 4 and the threshold is 3, the alarm may be set to a first type or a first intensity. When the counter value is 5 and the threshold is 3, the alarm may be set to a second type or a second intensity. Here, the second intensity may have a larger value than the first intensity. Here, the second type of alarm may transfer a more intuitive and stronger message to the user than the first type of alarm.

In an exemplary embodiment, the technique according to an exemplary embodiment of the present disclosure may use one counter or a plurality of counters. Further, a plurality of thresholds to be compared with the counter may be used. Further, the plurality of counters and the plurality of thresholds may be used.

An example of using one counter may be described as follows. In a situation in which one counter for N alarms exists, the counter may be increased or decreased by 1, or maintained according to the secondary anomaly estimation result (estimation value). A start value and/or a threshold range (min value and max value) of the counter may be set, and N thresholds between the min value and the max value for generating the alarm may be set. Here, N is the natural number. The counter is compared with each of N thresholds, and when the counter is equal to or more than a specific threshold, the alarm may be generated, and in a complex condition (when the counter is equal to or more than the plurality of thresholds), an alarm corresponding to a high threshold may be generated. For example, a situation is assumed in which the threshold range of the counter is min=0 and max=6, and the first threshold=3 and the second threshold=5. In such a situation, when the anomaly secondary estimation result is 1 in a specific image, the counter has the value of 1, and the alarm is not generated. When the anomaly secondary estimation result is 1 in a subsequent image, the counter has the value of 2, and the alarm is not generated. When the anomaly secondary estimation result is 1 in the subsequent image, the counter may have the value of 3, and the first alarm corresponding to the first threshold may be generated. When the anomaly secondary estimation result is 1 in the subsequent image, the counter may have the value of 4, and the first alarm corresponding to the first threshold may be generated. When the anomaly secondary estimation result is 1 in the subsequent image, the counter may have the value of 5, and the second alarm corresponding to the second threshold may be generated. When the anomaly secondary estimation result is 1 in the subsequent image, the counter may have the value of 5 as it is, and the second alarm corresponding to the second threshold may be generated. When the anomaly secondary estimation result is 0 in the subsequent image, the counter may have the value of 4, and the first alarm corresponding to the first threshold may be generated. When the anomaly secondary estimation result is 0 in the subsequent image, the counter may have the value of 3, and the first alarm corresponding to the first threshold may be generated. When the anomaly secondary estimation result is 0 in the subsequent image, the counter may have the value of 32, and the alarm may be turned off.

An example of using the plurality of counters may be described as follows. In a situation in which M counters for N alarms exists, each of the counters may be increased or decreased by 1, or maintained according to the secondary anomaly estimation result (estimation value). Here, each of N and M corresponds to the natural number. A start value and/or a threshold range (min value and max value) of each of the counters may be set, and each of M thresholds between the min value and the max value for generating the alarm may be set. N counters are compared with M thresholds, respectively, and when a specific counter is equal to or more than a specific threshold, the alarm may be generated. For example, the threshold range of the first counter is min=0 and max=4, and the first threshold having the value of 3 may be allocated to the first counter. Further, the threshold range of the second counter is min=0 and max=6, and the second threshold having the value of 5 may be allocated to the second counter. In such an example situation, when the anomaly secondary estimation result is 0 in a specific image, both the first counter and the second counter may have the value of 0, and the alarm is not generated. When the anomaly secondary estimation result is 1 in the subsequent image, both the first counter and the second counter may have the value of 1, and the alarm is not generated. When the anomaly secondary estimation result is 1 in the subsequent image, both the first counter and the second counter may have the value of 2, and the alarm is not generated. When the anomaly secondary estimation result is 1 in the subsequent image, both the first counter and the second counter may have the value of 3, and since the first counter is determined to be equal to or more than the first threshold, the first alarm or a primary alarm may be generated. When the anomaly secondary estimation result is 1 in the subsequent image, both the first counter and the second counter may have the value of 4, and since the first counter is determined to be equal to or more than the first threshold, the first alarm or the primary alarm may be continued. When the anomaly secondary estimation result is 1 in the subsequent image, the first counter may be maintained to the value of 4 which is the maximum value, and the second counter may have the value of 5, and the first counter may be determined to be equal to or more than the first threshold, and the second counter may be determined to be equal to or more than the second threshold. In this case, the second alarm or a secondary alarm may be generated. When the anomaly secondary estimation result is 0 in the subsequent image, the first counter may be decreased to the value of 3, and the second counter may be decreased to the value of 4, and since the first counter is determined to be equal to or more than the first threshold, the first alarm or the primary alarm may be generated. When the anomaly secondary estimation result is 0 in the subsequent image, the first counter may be decreased to the value of 2, and the second counter may be decreased to the value of 3, and as a result, the alarm may be turned off.

Figure 12:
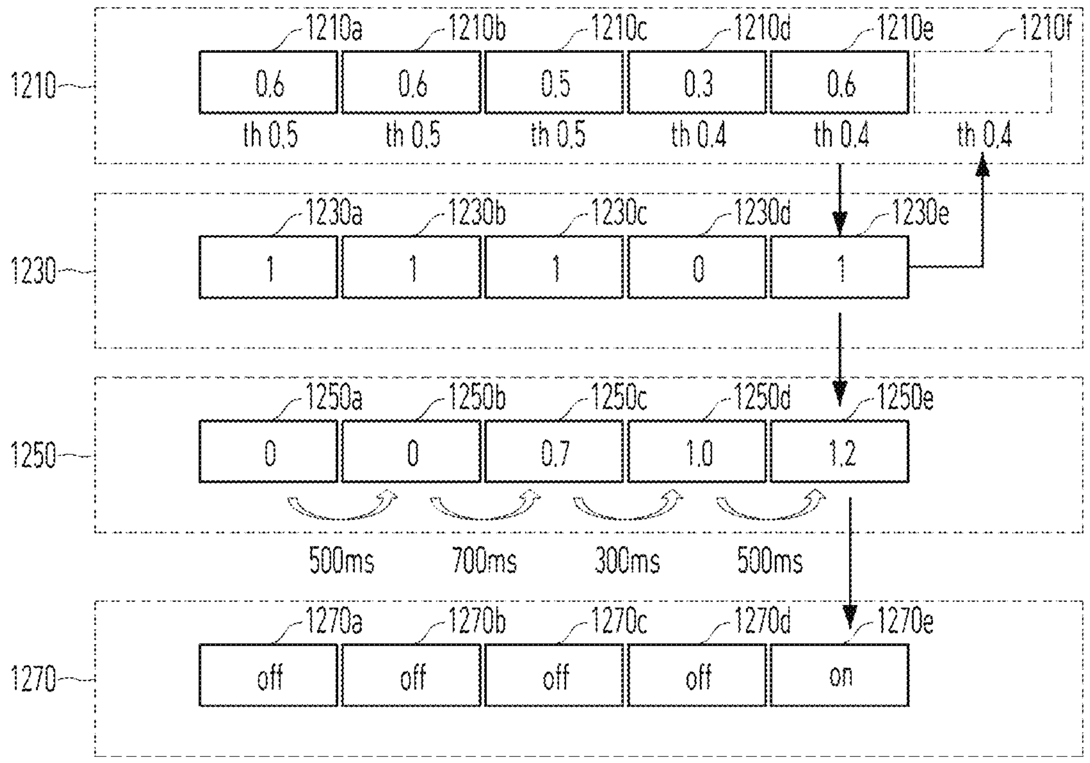
FIG. 12 exemplarily illustrates a method for determining an anomaly alarm of a driver according to an exemplary embodiment of the present disclosure.

FIG. 12 exemplarily illustrates a method for determining an anomaly alarm of a driver according to an exemplary embodiment of the present disclosure.

The above-described examples among the examples illustrated in FIG. 12 will be replaced with the above-described description in order to prevent duplication of the description.

A first queue 1210, and units 1210*a*, 1210*b*, 1210*c*, 1210*d*, 1210*e*, and 1210*f* included in the first queue in FIG. 12 may correspond to the first queue 1010, and the units 1010*a*, 1010*b*, 1010*c*, 1010*d*, 1010*e*, and 1010*f* included in the first queue in FIG. 10, respectively.

A second queue 1230, and units 1230*a*, 1230*b*, 1230*c*, 1230*d*, and 1230*e* included in the second queue in FIG. 12 may correspond to the second queue 1030, and the units 1030*a*, 1030*b*, 1030*c*, 1030*d*, and 1030*e* included in the second queue in FIG. 10, respectively.

In an exemplary embodiment, FIG. 12 also illustrates an example in which a threshold of the first queue 1210 is determined based on a value of at least one previous unit of the second queue 1230. Referring to the example of FIG. 12, a threshold corresponding to a subsequent unit of the first queue 1210 may be determined according to a majority value (e.g., a value having three or more value between 0 and 1) of values of five units of the second queue 1230. In the example of FIG. 12, a value of the first unit 1230*a* of the second queue 1230 may be determined as 1. It is assumed that four previous units of the first unit 1230*a* of the second queue 1230 have values of 0, 0, 0, and 0, respectively. Under the assumption, a majority value of values of the first unit 1230*a* of the second queue 1230, and four previous units may be determined as 0. As a result, a threshold corresponding to the second unit 1210*b* of the first queue 1210 may be determined as 0.5. Then, the second unit 1230*b* of the second queue 1230 may be determined to have the value of 1, and a majority value of values of the second unit 1230*b* of the second queue 1230, and four previous units may be determined as 0. As a result, a threshold corresponding to the third unit 1210*c* of the first queue 1210 may be determined as 0.5. Then, the third unit 1230*c* of the second queue 1230 may be determined to have the value of 1, and a majority value of values of the third unit 1230*c* of the second queue 1230, and four previous units may be determined as 1. As a result, a threshold corresponding to the fourth unit 1210*d* of the first queue 1210 may be determined as 0.4. Then, the fourth unit 1230*d* of the second queue 1230 may be determined to have the value of 0, and a majority value of values of the fourth unit 1230*d* of the second queue 1230, and four previous units may be determined as 1. As a result, a threshold corresponding to the fifth unit 1210*e* of the first queue 1210 may be determined as 0.4. Then, the fifth unit 1230*e* of the second queue 1230 may be determined to have the value of 1, and a majority value of values of the fifth unit 1230*e* of the second queue 1230, and four previous units (e.g., 1230*a*, 1230*b*, 1230*c*, and 1230*d*) may be determined as 1. As a result, a threshold corresponding to the sixth unit 1210*f* of the first queue 1210 may be determined as 0.4.

In an exemplary embodiment, values of the units 1250*a*, 1250*b*, 1250*c*, 1250*d*, and 1250*e* of the third queue 1250 may be determined based on the result of the first voting using the values of the units 1230*a*, 1230*b*, 1230*c*, 1230*d*, and 1230*e* included in the second queue 1230. The value included in the unit of the third queue 1250 may be determined based on the majority value, the representative value, or the ratio of the anomaly primary estimation results.

A third queue 1250, and a first unit 1250*a*, a second unit 1250*b*, a third unit 1250*c*, a fourth unit 1250*d*, and a fifth unit 1250*e* included in the third queue 1250 in FIG. 12 may correspond to the first unit 1150*a*, the second unit 1150*b*, the third unit 1150*c*, the fourth unit 1150*d*, and the fifth unit 1150*e* of the third queue 1150, respectively. That is, FIG. 12 illustrates voting queues to which the counter is applied. FIG. 12 exemplarily illustrates a scheme in which the unit of the increase or decrease of the counter value is not 1. FIG. 12 illustrates an exemplary embodiment in which a difference value between receiving times of images is used as the unit of the increase or decrease of the counter value.

In an exemplary embodiment, a difference between a receiving time of a first image corresponding to the first unit 1250*a* of the third queue 1250 and a receiving time of a second image corresponding to the second unit 1250*b* may be determined as 500 ms. As a result, the unit of the increase or decrease of the counter value between the first unit 1250*a* and the second unit 1250*b* may be set to 500 ms. A difference between a receiving time of a second image corresponding to the second unit 1250*b* of the third queue 1250 and a receiving time of a third image corresponding to the third unit 1250*c* may be determined as 700 ms. As a result, the unit of the increase or decrease of the counter value between the second unit 1250*b* and the third unit 1250*c* may be set to 700 ms. A difference between a receiving time of a third image corresponding to the third unit 1250*c* of the third queue 1250 and a receiving time of a fourth image corresponding to the fourth unit 1250*d* may be determined as 300 ms. As a result, the unit of the increase or decrease of the counter value between the third unit 1250*c* and the fourth unit 1250*d* may be set to 300 ms. A difference between a receiving time of a fourth image corresponding to the fourth unit 1250*d* of the third queue 1250 and a receiving time of a fifth image corresponding to the fifth unit 1250*e* may be determined as 500 ms. As a result, the unit of the increase or decrease of the counter value between the fourth unit 1250*d* and the fifth unit 1250*e* may be set to 500 ms.

In an exemplary embodiment, the fourth queue 1270 may correspond to a queue for generating the alarm. In an exemplary embodiment, values of the units 1270*a*, 1270*b*, 1270*c*, 1270*d*, and 1270*e* of the fourth queue 1270 may be determined based on a second voting using the values of the units of the third queue 1250.

As described above, the technique according to an exemplary embodiment of the present disclosure may use a plurality of queues and a plurality of votings in order to generate the anomaly alarm and/or in order to determine the type and the intensity of anomaly alarm. Furthermore, the technique according to an exemplary embodiment of the present disclosure may determine a user-friendly and more accurate alarm by using one or more counters and one or more thresholds.

FIG. 12 exemplarily illustrates an exemplary embodiment in which the threshold has a value of 1.1. As a result, the anomaly alarm may be determined to be ON with respect to the fifth unit 1270*e* of the fourth queue 1270.

Figure 13:
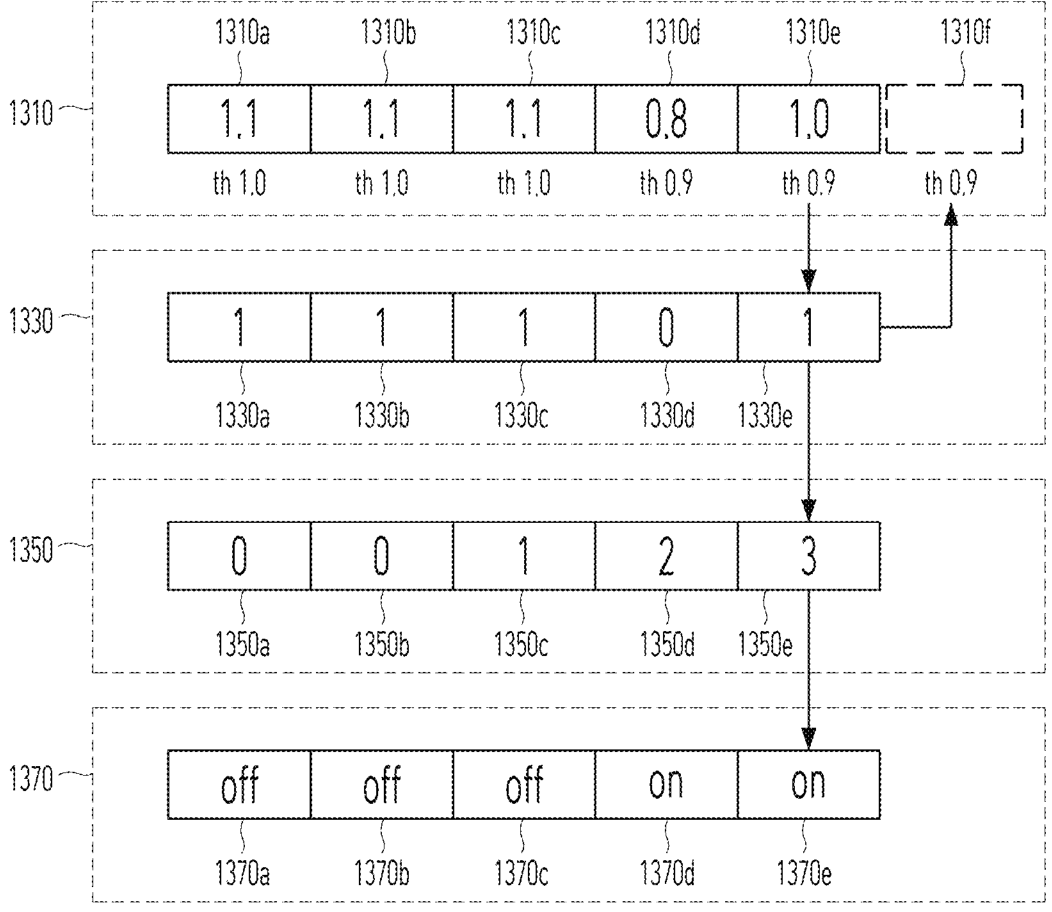
FIG. 13 exemplarily illustrates a methodology for determining a distraction alarm of a driver according to an exemplary embodiment of the present disclosure.

FIG. 13 exemplarily illustrates a methodology for determining a distraction alarm of a driver according to an exemplary embodiment of the present disclosure.

In an exemplary embodiment, the first queue 1310 may include a first unit 1310*a*, a second unit 1310*b*, a third unit 1310*c*, a fourth unit 1310*d*, and a fifth unit 1310*e*. The first queue 1310 may include values quantitatively indicating a distraction detection result, a distraction score, and/or a distraction classification result of a target image. Corresponding units in the first queue 1310, second queue 1330, third queue 1350, and fourth queue 1370, respectively may include a judgment result for the same image received at the same time. For example, the first unit 1310*a* of the first queue 1310, the first unit 1330*a* of the second queue 1330, the first unit 1350*a* of the third queue 1350, and the first unit 1370*a* of the fourth queue 1370 may have a value corresponding to a first image received at a first time. For example, the first image received at the first time may be processed in the order of the first unit 1310*a* of the first queue 1310, the first unit 1330*a* of the second queue 1330, the first unit 1350*a* of the third queue 1350, and the first unit 1370*a* of the fourth queue 1370. According to a result of the processing, the fourth queue 1370 corresponding to a last queue may include a result of ON or OFF of the distraction alarm corresponding to each image.

In an exemplary embodiment, the first queue 1310 may represent a distraction score in an image received from a model (or in an ROI). In a non-limited example, the first queue 1310 may represent a maximum score related to distraction detection in the image received from the model. As an example, the maximum score may mean a result having the maximum score among processing results for a specific image generated by the model. The distraction score may indicate that a likelihood in which the distraction will be present is higher as a score of the distraction score is higher.

The units 1310*a*, 1310*b*, 1310*c*, 1310*d*, and 1310*e* of the first queue 1310 may be compared with corresponding thresholds, respectively. When the value of the unit exceeds the threshold, the value of 1 may be allocated to a corresponding unit of the second queue 1330. When the value of the unit does not exceed the threshold, the value of 0 may be allocated to the corresponding unit of the second queue 1330. In the example of FIG. 13, since the value of the first unit 1310*a* of the first queue 1310 is 1.1, and the threshold is 1.0, the first unit 1330*a* of the second queue 1330 corresponding to the first unit 1310*a* of the first queue 1310 may have the value of 1 indicating that the distraction is present. As described above, each of the units 1330*a*, 1330*b*, 1330*c*, 1330*d*, and 1330*e* of the second queue 1330 may include a distraction primary estimation result.

A threshold corresponding to the sixth unit 1310*f* of the first queue 1310 may be determined by using at least one of the units 1330*a*, 1330*b*, 1330*c*, 1330*d*, and 1330*e* of the second queue 1330. As such, the thresholds allocated to the units 1310*a*, 1310*b*, 1310*c*, 1310*d*, and 1310*e* of the first queue 1310, respectively may be determined by using at least some of the values 1330*a*, 1330*b*, 1330*c*, 1330*d*, and 1330*e* of the units of the second queue 1330.

For example, the threshold of the sixth unit 1310*f* of the first queue 1310 may be variable according to the value of the fifth unit 1330*e* of the second queue 1330. In such an example, when the fifth unit 1330*e* is 1, the threshold of the sixth unit 1310*f* may be decreased or maintained to the minimum value compared to a previous threshold of the fifth unit 1310*e*. In such an example, when the fifth unit 1330*e* is 0, the threshold of the sixth unit 1310*f* may be increased or maintained to the maximum value compared to the previous threshold of the fifth unit 1310*e*.

For example, the threshold of the sixth unit 1310*f* of the first queue 1310 may be determined based on comparison between the values of the previous units 1330*a*, 1330*b*,

1330*c*, 1330*d*, and 1330*e* of the second queue 1330 and a threshold ratio. When the plurality of previous units 1330*a*, 1330*b*, 1330*c*, 1330*d*, and 1330*e* have the values of 1, 1, 1, 0, and 1, respectively, and the threshold ratio for the value of 1 is 60%, the ratio of 1 in the plurality of previous units 1330*a*, 1330*b*, 1330*c*, 1330*d*, and 1330*e* exceeds the threshold ratio, so the threshold of the sixth unit 1310*f* of the first queue 1310 may be decreased or maintained to the minimum value compared to the previous threshold of the fifth unit 1310*e*.

For example, the threshold of the sixth unit 1310*f* of the first queue 1310 may be variable according to what a majority value or a representative value of the plurality of previous units 1330*a*, 1330*b*, 1330*c*, 1330*d*, and 1330*e* of the second queue 1330 is. In the example of FIG. 13, since the majority value or a representative value of the plurality of previous units 1330*a*, 1330*b*, 1330*c*, 1330*d*, and 1330*e* is 1, the threshold of the sixth unit 1310*f* of the first queue 1310 may be decreased or maintained to the minimum value compared to the previous threshold of the fifth unit 1310*e*.

For example, the threshold of the sixth unit 1310*f* of the first queue 1310 may be variable according to the value(s) allocated to the previous unit(s) of the third queue 1350.

In an exemplary embodiment, FIG. 13 also illustrates an example in which a threshold of the first queue 1310 is determined based on a value of at least one previous unit of the second queue 1330. Referring to the example of FIG. 13, a threshold corresponding to a subsequent unit of the first queue 1310 may be determined according to a majority value (e.g., a value having three or more values between 0 and 1) of values of five units of the second queue 1330. In such an example, when the value of 1 is determined as the majority value, the threshold of the subsequent unit of the first queue 1310 may be determined as 0.9, and in other cases, the threshold of the subsequent unit of the first queue 1310 may be determined as 1.0. In the example of FIG. 13, a value of the first unit 1330*a* of the second queue 1330 may be determined as 1. It is assumed that four previous units of the first unit 1330*a* of the second queue 1330 have values of 0, 0, 0, and 0, respectively. Under the assumption, a majority value of values of the first unit 1330*a* of the second queue 1330, and four previous units may be determined as 0. As a result, a threshold corresponding to the second unit 1310*b* of the first queue 1310 may be determined as 1.0. Then, the second unit 1330*b* of the second queue 1330 may be determined to have the value of 1, and a majority value of values of the second unit 1330*b* of the second queue 1330, and four previous units may be determined as 0. As a result, a threshold corresponding to the third unit 1310*c* of the first queue 1310 may be determined as 1.0. Then, the third unit 1330*c* of the second queue 1330 may be determined to have the value of 1, and a majority value of values of the third unit 1330*c* of the second queue 1330, and four previous units may be determined as 1. As a result, a threshold corresponding to the fourth unit 1310*d* of the first queue 1310 may be determined as 0.9. Then, the fourth unit 1330*d* of the second queue 1330 may be determined to have the value of 0, and a majority value of values of the fourth unit 1330*d* of the second queue 1330, and four previous units may be determined as 1. As a result, a threshold corresponding to the fifth unit 1310*e* of the first queue 1310 may be determined as 0.9. Then, the fifth unit 1330*e* of the second queue 1330 may be determined to have the value of 1, and a majority value of values of the fifth unit 1330*e* of the second queue 1330, and four previous units (e.g., 1330*a*, 1330*b*, 1330*c*, and 1330*d*) may be determined as 1. As a result, a threshold corresponding to the sixth unit 1310*f* of the first queue 1310 may be determined as 0.9.

In an exemplary embodiment, the third queue 1350 may include a distraction secondary estimation result. A value of each of the units 1350*a*, 1350*b*, 1350*c*, 1350*d*, and 1350*e* of the third queue 1350 may be determined by using the first voting. The distraction secondary estimation result may be determined based on a majority value, a representative value, or a ratio value of distraction primary estimation results of a plurality of units of the second queue 1330. For example, when the majority value, the representative value, or the ratio value of the distraction primary estimation results of the plurality of units of the second queue 1330 is determined as 1, the value of 1 may be added to a corresponding unit of the third queue 1350 or the value of the corresponding unit may be maintained to be the maximum value. For example, when the majority value, the representative value, or the ratio value of the distraction primary estimation results of the plurality of units of the second queue 1330 is determined as 0, the value of 1 may be subtracted from the corresponding unit of the third queue 1350 or the value of the corresponding unit may be maintained to be the minimum value.

As described above, in the example of FIG. 13, the distraction secondary estimation result may be expressed as a value of a counter. As illustrated in the example of FIG. 13, the first unit 1350*a* and the second unit 1350*b* of the third queue 1350 may have the value of 0. In order to determine the value of the third unit 1350*c* of the third queue 1350, the first unit 1330*a*, the second unit 1330*b*, and the third unit 1330*c* of the second queue 1330 may be used. Further, in order to determine the value of the third unit 1350*c* of the third queue 1350, a value of a unit received prior to the first unit 1330*a* other than the first unit 1330*a*, the second unit 1330*b*, and the third unit 1330*c* of the second queue 1330 may also be used. For example, in FIG. 13, since a majority value of values of the first unit 1330*a*, the second unit 1330*b*, and the third unit 1330*c* (or additional previous units) is determined as 1, the value of 1 may be added to the third unit 1350*c* of the third queue 1350. By the same scheme, the value of 1 is added to the fourth unit 1350*d* of the third queue 1350, so the fourth unit 1350*d* may have the value of 2. By the same scheme, the value of 1 is added to the fifth unit 1350*e* of the third queue 1350, so the fifth unit 1350*e* may have the value of 3.

In an additional exemplary embodiment, a methodology that the distraction secondary estimation result represents whether the distraction is present as 0 and 1 may also be included in the scope of the present disclosure. According to such an exemplary embodiment, the value of 1 may be allocated to the third unit 1350*c* of the third queue 1350, the value of 1 may be allocated to the fourth unit 1350*d* of the third queue 1350, and the value of 1 may be allocated to the fifth unit 1350*e* of the third queue 1350.

In an exemplary embodiment, the fourth queue 1370 may correspond to a queue for determining the distraction alarm. The units 1370*a*, 1370*b*, 1370*c*, 1370*d*, and 1370*e* of the fourth queue 1370 may have values related to whether the alarm is generated, the type of alarm, and/or the intensity of the alarm. As illustrated in the example of FIG. 13, the values of the units 1370*a*, 1370*b*, 1370*c*, 1370*d*, and 1370*e* of the fourth queue 1370 may be determined by using the second voting. The second voting may include comparing the value of each of the units 1350*a*, 1350*b*, 1350*c*, 1350*d*, and 1350*e* of the third queue 1350, and a corresponding alarm threshold. When the value of each of the units 1350*a*,

1350*b*, 1350*c*, 1350*d*, and 1350*e* of the third queue 1350 is equal to or more than the alarm threshold, the value of the corresponding unit of the fourth queue 1370 may be determined to be ON. When the value of each of the units 1350*a*, 1350*b*, 1350*c*, 1350*d*, and 1350*e* of the third queue 1350 is less than the alarm threshold, the value of the corresponding unit of the fourth queue 1370 may be determined to be OFF. In the example of FIG. 13, it is assumed that the alarm threshold is 2, and as a result, an ON value of the distraction alarm may be allocated to the fourth unit 1370*d* and the fifth unit 1370*e* of the fourth queue 1370.

In an additional exemplary embodiment, the values of the units 1370*a*, 1370*b*, 1370*c*, 1370*d*, and 1370*e* of the fourth queue 1370 may be determined based on whether there is continuity in at least some of the units 1350*a*, 1350*b*, 1350*c*, 1350*d*, and 1350*e* of the third queue 1350. In such an exemplary embodiment, when it is assumed that a continuity threshold is 3, since all of the third unit 1350*c*, the fourth unit 1350*d*, and the fifth unit 1350*e* of the third queue 1350 have the value of 1, the ON value of the distraction alarm may be allocated to the fifth unit 1370*e* of the fourth queue 1370, and an OFF value of the distraction alarm may be allocated to the fourth unit 1370*d*.

In FIG. 13, exemplary embodiments in which one or more counters and/or a plurality of thresholds are used when determining the distraction alarm will also belong to the scope of the present disclosure.

As described above, the technique according to an exemplary embodiment of the present disclosure may use a plurality of queues, a plurality of votings, counter values, continuity values, and/or variable thresholds in order to judge whether the distraction is present or generate the alarm corresponding to the distraction. As a value included in a specific queue or a threshold allocated to the specific queue may be set to be determined by using values included in another queue (e.g., previous queue) among the plurality of queues, an inter-correlation between respective queues may be achieved. As described above, the technique according to an exemplary embodiment of the present disclosure may provide a distraction alarm having higher accuracy by adding a plurality of judgments for alarm generation in order to maximize a user experience.

Figure 14:
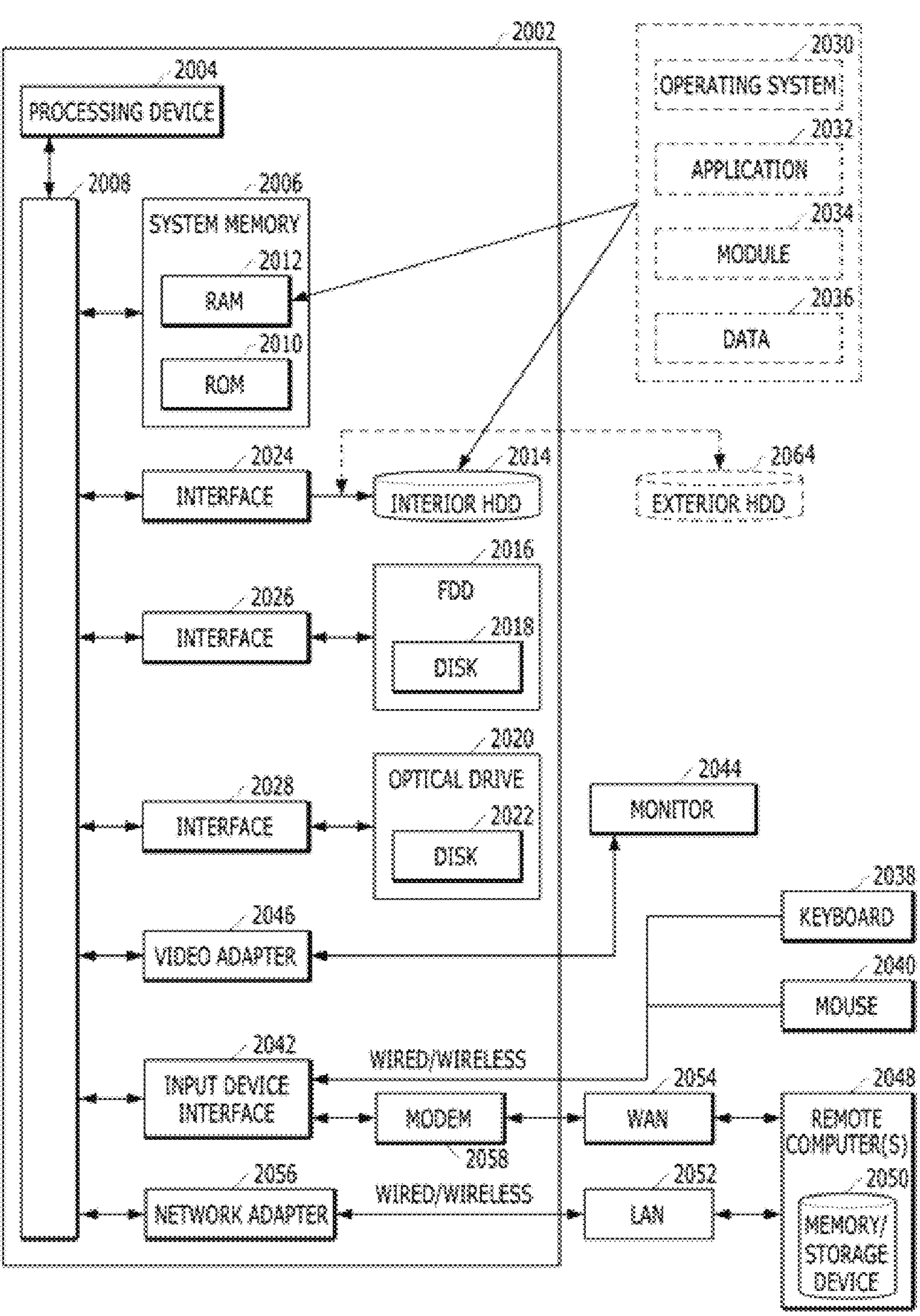
FIG. 14 is a schematic diagram of a computing environment according to an exemplary embodiment of the present disclosure.

FIG. 14 is a schematic view of a computing environment of the computing device 100 according to an exemplary embodiment of the present disclosure.

In the present disclosure, the computing device, the computer, the system, the component, the module, or the unit includes a routine, a procedure, a program, a component, and a data structure that perform a specific task or implement a specific abstract data type. Further, it will be well appreciated by those skilled in the art that the methods presented by the present disclosure can be implemented by other computer system configurations including a personal computer, a handheld computing device, microprocessor-based or programmable home appliances, and others (the respective devices may operate in connection with one or more associated devices) as well as a single-processor or multi-processor computing device, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computing device generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 2000 that implements various aspects of the present disclosure including a computer 2002 is shown and the computer 2002 includes a processing device 2004, a system memory 2006, and a system bus 2008. The computer 200 in the present disclosure may be used intercompatibly with the computer device 100. The system bus 2008 connects system components including the system memory 2006 (not limited thereto) to the processing device 2004. The processing device 2004 may be a predetermined processor among various commercial processors. A dual processor and other multi-processor architectures may also be used as the processing device 2004.

The system bus 2008 may be any one of several types of bus structures which may be additionally interconnected to a local bus using any one of a memory bus, a peripheral device bus, and various commercial bus architectures. The system memory 2006 includes a read only memory (ROM) 2010 and a random access memory (RAM) 2012. A basic input/output system (BIOS) is stored in the non-volatile memories 2010 including the ROM, the EPROM, the EEPROM, and the like and the BIOS includes a basic routine that assists in transmitting information among components in the computer 2002 at a time such as in-starting. The RAM 2012 may also include a high-speed RAM including a static RAM for caching data, and the like.

The computer 2002 also includes an internal hard disk drive (HDD) 2014 (for example, EIDE and SATA), an external hard disk (for example, USB, Thunderbolt, eSATA) 2064, a magnetic floppy disk drive (FDD) 2016 (for example, for reading from or writing in a mobile diskette 2018), SSD and an optical disk drive 2020 (for example, for reading a CD-ROM disk 2022 or reading from or writing in other high-capacity optical media such as the DVD). The hard disk drive 2014 and 2064, the magnetic disk drive 2016, and the optical disk drive 2020 may be connected to the system bus 2008 by a hard disk drive interface 2024, a magnetic disk drive interface 2026, and an optical drive interface 2028, respectively. An interface 2024 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 2002, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 2030, one or more application programs 2032, other program module 2034, and program data 2036 may be stored in the drive and the RAM 2012. All or some of the operating system, the application, the module, and/or the data may also be cached in the RAM 2012. It will be well appreciated that the present disclosure may be implemented in operating systems which are commercially usable or a combination of the operating systems.

A user may input instructions and information in the computer 2002 through one or more wired/wireless input devices, for example, pointing devices such as a keyboard 2038 and a mouse 2040. Other input devices (not illustrated) may include a microphone, an IR remote controller, a joystick, a game pad, a stylus pen, a touch screen, and others. These and other input devices are often connected to the processing device 2004 through an input device interface 2042 connected to the system bus 2008, but may be connected by other interfaces including a parallel port, an IEEE 1394 serial port, a game port, a USB port, an IR interface, and others.

A monitor 2044 or other types of display devices are also connected to the system bus 2008 through interfaces such as a video adapter 2046, and the like. In addition to the monitor 2044, the computer generally includes a speaker, a printer, and other peripheral output devices (not illustrated).

The computer 2002 may operate in a networked environment by using a logical connection to one or more remote computers including remote computer(s) 2048 through wired and/or wireless communication. The remote computer (s) 2048 may be a workstation, a server computer, a router, a personal computer, a portable computer, a micro-processor based entertainment apparatus, a peer device, or other general network nodes and generally includes multiple components or all of the components described with respect to the computer 2002, but only a memory storage device 2050 is illustrated for brief description. The illustrated logical connection includes a wired/wireless connection to a local area network (LAN) 2052 and/or a larger network, for example, a wide area network (WAN) 2054. The LAN and WAN networking environments are general environments in offices and companies and facilitate an enterprise-wide computer network such as Intranet, and all of them may be connected to a worldwide computer network, for example, the Internet.

When the computer 2002 is used in the LAN networking environment, the computer 2002 is connected to a local network 2052 through a wired and/or wireless communication network interface or an adapter 2056. The adapter 2056 may facilitate the wired or wireless communication to the LAN 2052 and the LAN 2052 also includes a wireless access point installed therein in order to communicate with the wireless adapter 2056. When the computer 2002 is used in the WAN networking environment, the computer 2002 may include a modem 2058, is connected to a communication server on the WAN 2054, or has other means that configure communication through the WAN 2054 such as the Internet, etc. The modem 2058 which may be an internal or external and wired or wireless device is connected to the system bus 2008 through the serial port interface 2042. In the networked environment, the program modules described with respect to the computer 2002 or some thereof may be stored in the remote memory/storage device 2050. It will be well known that an illustrated network connection is exemplary and other means configuring a communication link among computers may be used.

The computer 2002 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Method claims provide elements of various steps in a sample order, but the method claims are not limited to the presented specific order or hierarchical structure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for detecting distraction of a driver in a driver monitoring system, performed by a computing device, comprising:

receiving a first image including a driver within a vehicle;

determining a gaze class corresponding to the first image among a plurality of gaze classes by using a first model in response to the receiving the first image, wherein the plurality of gaze classes include a first gaze class indicating that the driver is gazing in a front direction and a second gaze class indicating that the driver is gazing in a non-front direction; and determining whether the distraction of the driver is present in the first image based on the gaze class corresponding to the first image, and wherein the determining whether the distraction of the driver is present in the first image comprises:

extracting a yaw value and a pitch value from the first image; and determining whether the distraction of the driver is present in the first image, by using a distance between the extracted yaw value and pitch value and a gaze cluster corresponding to the determined gaze class of the first image among a plurality of gaze clusters generated by clustering selected reference images.

2. The method of claim 1, wherein the determining whether the distraction of the driver is present in the first image comprises:

setting a distraction score indicating a likelihood of the distraction of the driver higher, as a distance between the extracted yaw value and pitch value from the first image and at least one cluster belonging to the first gaze class is greater, or a distance between the extracted yaw value and pitch value from the first image and at least one cluster belonging to the second gaze class is smaller.

3. The method of claim 2, wherein the yaw value and pitch value corresponding to the driver's face in the first image are generated by a second model different from the first model, and the second model is an artificial intelligence model pre-trained to output a yaw value and a pitch value corresponding to the driver's face in the first image from the first image.

4. The method of claim 1, wherein the first model corresponds to an artificial intelligence model pre-trained to output, in response to a yaw value and a pitch value extracted from an image, a gaze class corresponding to the yaw value and the pitch value extracted from the image and a distance between the yaw value and the pitch value and the gaze class, wherein the pre-trained first model is updated by additionally receiving a reference image extracted according to a pre-determined condition, and wherein the oldest reference image based on a receiving time of reference images is deleted from a queue, when the received reference image exceeds a threshold size of the queue of the first model.

5. The method of claim 1, wherein the first model corresponds to an artificial intelligence model pre-trained by using a training dataset generated by clustering a dataset consisting of reference images that satisfy a condition that a driving speed of the vehicle exceeds or equal to a selected threshold speed among multiple images.

6. The method of claim 5, wherein the training dataset is generated by labeling each of the plurality of gaze clusters as the first gaze class indicating the driver is gazing in the front direction or the second gaze class indicating the driver is gazing in the non-front direction, based on quantitative information of images included in each of the plurality of gaze clusters generated by clustering the reference images.

7. The method of claim 1, wherein the determining whether the distraction of the driver is present in the first image comprises:

determining a first distraction score corresponding to the first image, based on the gaze cluster corresponding to the first image among the plurality of gaze clusters generated by clustering the selected reference images and the yaw value and the pitch value extracted from the first image;

generating a first distraction primary estimation result indicating whether the distraction is present in the first image by comparing the first distraction score with a first threshold value; and determining a distraction alarm corresponding to the first image by performing a first voting using the first distraction primary estimation result, and wherein the first voting generates a group distraction estimation result representing an image group consisting of the first image and a selected first number of sequential images received prior to the first image, by using a first distraction primary estimation result of each of the first image and the selected first number of the sequential images received prior to the first image, and generates a first distraction secondary estimation result to be used as a parameter for determining a distraction alarm corresponding to the first image, and wherein the group distraction estimation result includes a result value representing the group among a result value indicating a presence of the distraction and a result value indicating an absence of the distraction.

8. The method of claim 7, wherein the first threshold value is determined based on at least one previous distraction primary estimation result corresponding to at least one previous image received prior to the first image.

9. The method of claim 1, wherein the determining whether the distraction of the driver is present in the first image comprises:

determining a first distraction score corresponding to the first image, based on a gaze cluster corresponding to the first image among the plurality of gaze clusters generated by clustering the selected reference images and the yaw value and the pitch value extracted from the first image;

generating a first distraction primary estimation result indicating whether the distraction is present in the first image by comparing the first distraction score with a first threshold value;

generating a first distraction secondary estimation result by performing a first voting using the first distraction primary estimation result; and determining a distraction alarm corresponding to the first image by performing a second voting using the first distraction secondary estimation result, and wherein the first voting generates a distraction secondary estimation result to be used in the second voting by using a distraction primary estimation result of each of a plurality of images including the first image, and the second voting is used to determine the distraction alarm by using the distraction secondary estimation result of each of the plurality of images including the first image.

10. The method of claim 9, wherein the second voting determines whether there is continuity in distraction secondary estimation results within an image group consisting of the first image and a selected second number of sequential images received prior to the first image, and wherein the determining the distraction alarm corresponding to the first image comprises determining to generate the distraction alarm when there is continuity in the distraction secondary estimation results.

11. The method of claim 9, wherein the generating the first distraction secondary estimation result comprises, generating one or more current counter values corresponding to the first image by increasing or decreasing one or more previous counter values corresponding to a second image received prior to the first image based on a result of the first voting, and generating the first distraction secondary estimation result including the one or more current counter values; and wherein the determining a distraction alarm corresponding to the first image comprises:

determining ON or OFF state of one or more distraction alarms corresponding to the first image by comparing the one or more current counter values with one or more selected counter threshold values.

12. The method of claim 9, wherein the determining the first distraction secondary estimation result comprises:

determining at least one current counter value corresponding to the first image by increasing or decreasing at least one previous counter value corresponding to a second image received prior to the first image based on a result of the first voting, and wherein a unit of an increase or a decrease in the at least one previous counter value is determined based on a time difference between a receiving time of the second image and a receiving time of the first image.

13. The method of claim 1, wherein the determining the gaze class corresponding to the first image comprises:

extracting the yaw value and the pitch value from the first image;

determining the gaze cluster corresponding to the first image among the plurality of gaze clusters generated by clustering reference images extracted based on a selected condition, based on a distance between the extracted yaw value and pitch value and a result of the clustering of the reference images; and determining the gaze class corresponding to the first image as a gaze class to which the gaze cluster corresponding to the first image belongs among the plurality of gaze classes.

14. A computer program stored in a non-transitory computer readable storage medium, wherein the computer program allows at least one processor to perform following operations to detect distraction of a driver in a driver monitoring system when executed by the at least one processor, and wherein the operations comprise:

receiving a first image including a driver within a vehicle;

determining a gaze class corresponding to the first image among a plurality of gaze classes by using a first model in response to the receiving the first image, wherein the plurality of gaze classes include a first gaze class indicating that the driver is gazing in a front direction and a second gaze class indicating that the driver is gazing in a non-front direction; and determining whether the distraction of the driver is present in the first image based on the gaze class corresponding to the first image, and wherein the determining whether the distraction of the driver is present in the first image comprises:

extracting a yaw value and a pitch value from the first image; and determining whether the distraction of the driver is present in the first image, by using a distance between the extracted yaw value and pitch value and a gaze cluster corresponding to the determined gaze class of the first image among a plurality of gaze clusters generated by clustering selected reference images.

15. A computing device, comprising:

at least one processor; and a memory, wherein the at least one processor is configured to:

receive a first image including a driver within a vehicle;

determine a gaze class corresponding to the first image among a plurality of gaze classes by using a first model in response to the receiving the first image, wherein the plurality of gaze classes include a first gaze class indicating that the driver is gazing in a front direction and a second gaze class indicating that the driver is gazing in a non-front direction; and determine whether the distraction of the driver is present in the first image based on the gaze class corresponding to the first image, and wherein the determining of whether the distraction of the driver is present in the first image comprises:

extracting a yaw value and a pitch value from the first image; and determining whether the distraction of the driver is present in the first image, by using a distance between the extracted yaw value and pitch value and a gaze cluster corresponding to the determined gaze class of the first image among a plurality of gaze clusters generated by clustering selected reference images.

16. The computing device of claim 15, wherein the determining whether the distraction of the driver is present in the first image comprises:

setting a distraction score indicating a likelihood of the distraction of the driver higher, as a distance between the extracted yaw value and pitch value from the first image and at least one cluster belonging to the first gaze class is greater, or a distance between the extracted yaw value and pitch value from the first image and at least one cluster belonging to the second gaze class is smaller.

17. The computing device of claim 16, wherein the yaw value and pitch value corresponding to the driver's face in the first image are generated by a second model different from the first model, and the second model is an artificial intelligence model pre-trained to output a yaw value and a pitch value corresponding to the driver's face in the first image from the first image.

18. The computing device of claim 15, wherein the first model corresponds to an artificial intelligence model pre-trained to output, in response to a yaw value and a pitch value extracted from an image, a gaze class corresponding to the yaw value and the pitch value extracted from the image and a distance between the yaw value and the pitch value and the gaze class, wherein the pre-trained first model is updated by additionally receiving a reference image extracted according to a pre-determined condition, and wherein the oldest reference image based on a receiving time of reference images is deleted from a queue, when the received reference image exceeds a threshold size of the queue of the first model.

19. The computing device of claim 15, wherein the first model corresponds to an artificial intelligence model pre-trained by using a training dataset generated by clustering a dataset consisting of reference images that satisfy a condition that a driving speed of the vehicle exceeds or equal to a selected threshold speed among multiple images.

20. The computing device of claim 19, wherein the training dataset is generated by labeling each of the plurality of gaze clusters as the first gaze class indicating the driver is gazing in the front direction or the second gaze class indicating the driver is gazing in the non-front direction, based on quantitative information of images included in each of the plurality of gaze clusters generated by clustering the reference images.

* * * * *